US011887771B2

(12) United States Patent
Sakamoto et al.

(10) Patent No.: US 11,887,771 B2
(45) Date of Patent: Jan. 30, 2024

(54) ELECTRONIC COMPONENT AND METHOD FOR MANUFACTURING ELECTRONIC COMPONENT

(71) Applicant: SUMIDA CORPORATION, Tokyo (JP)

(72) Inventors: Shinichi Sakamoto, Tokyo (JP); Zhigang Cheng, Panyu (CN); Fernando Chan Mock, Naperville, IL (US); Mitsugu Kawarai, Tokyo (JP)

(73) Assignee: SUMIDA CORPORATION

( * ) Notice: Subject to any disclaimer, the term of this patent is extended or adjusted under 35 U.S.C. 154(b) by 141 days.

(21) Appl. No.: 17/374,365

(22) Filed: Jul. 13, 2021

(65) Prior Publication Data

US 2021/0343469 A1 Nov. 4, 2021

Related U.S. Application Data

(60) Continuation of application No. 16/551,116, filed on Aug. 26, 2019, now Pat. No. 11,094,451, which is a (Continued)

(30) Foreign Application Priority Data

Mar. 29, 2013 (CN) ......................... 201310109345.6
Feb. 13, 2014 (CN) ......................... 201410050474.7

(51) Int. Cl.
*H01F 27/29* (2006.01)
*H01F 27/28* (2006.01)

(Continued)

(52) U.S. Cl.
CPC ......... *H01F 27/2828* (2013.01); *H01F 27/24* (2013.01); *H01F 27/29* (2013.01);

(Continued)

(58) Field of Classification Search
CPC ...... H01F 27/2828; H01F 27/24; H01F 27/29; H01F 27/292; H01F 27/30; H01F 2017/048
See application file for complete search history.

(56) References Cited

U.S. PATENT DOCUMENTS 3,255,512 A 6/1966 Lochner
3,655,971 A 4/1972 Haas et al.

(Continued)

FOREIGN PATENT DOCUMENTS

CN 101441929 A 5/2009
CN 101697309 A 4/2010

(Continued)

OTHER PUBLICATIONS

Chinese Office Action for Application No. CN201410050474.7 dated Feb. 25, 2016 (24 pages).

(Continued)

*Primary Examiner* — Mang Tin Bik Lian
(74) *Attorney, Agent, or Firm* — Harness, Dickey & Pierce, P.L.C.

(57) ABSTRACT

An electronic component comprises: a magnetic core having a flat base and a core, the flat base having a top, a bottom, and first and second opposite sides, the core is on the top; a winding having an edgewise coil including a wound flat wire and the core, the winding having two non-wound flat wires extending therefrom; and a magnetic exterior body covering the core and the edgewise coil. The two non-wound flat wires extend along the top, the first side, the bottom and then the second side, and the two non-wound flat wires are non-adhesively positioned around the flat base. The two non-wound flat wires on the bottom are externally exposed electrodes. The second side inclines towards the core. The two ends of the two non-wound flat wires are embedded into (Continued)

the magnetic exterior body to fix the two non-wound flat wires to the magnetic exterior body.

7 Claims, 14 Drawing Sheets

Related U.S. Application Data division of application No. 15/364,749, filed on Nov. 30, 2016, now Pat. No. 10,438,737, which is a division of application No. 14/209,205, filed on Mar. 13, 2014, now Pat. No. 9,576,721, which is a continuation-in-part of application No. 13/804,857, filed on Mar. 14, 2013, now Pat. No. 9,087,634.

(51) Int. Cl.

| | |
|---|---|
| ***H01F 41/02*** | (2006.01) |
| ***H01F 41/04*** | (2006.01) |
| ***H01F 27/30*** | (2006.01) |
| ***H01F 41/061*** | (2016.01) |
| ***H01F 27/24*** | (2006.01) |

(52) U.S. Cl.
CPC ........... *H01F 27/292* (2013.01); *H01F 27/30* (2013.01); *H01F 41/0206* (2013.01); *H01F 41/04* (2013.01); *H01F 41/061* (2016.01); *Y10T 29/49073* (2015.01)

(56) References Cited

U.S. PATENT DOCUMENTS

| | | | | |
|---|---|---|---|---|
| 3,720,738 | A | 3/1973 | Munk | |
| 4,059,376 | A | 11/1977 | Ito et al. | |
| 4,498,067 | A | 2/1985 | Kumokawa et al. | |
| 5,307,041 | A | 4/1994 | Kato et al. | |
| 6,292,083 | B1 * | 9/2001 | Tajima | H01F 27/292 336/209 |
| 6,296,699 | B1 | 10/2001 | Jin | |
| 6,348,850 | B1 | 2/2002 | Kimura et al. | |
| 6,392,525 | B1 | 5/2002 | Kato et al. | |
| 6,710,692 | B2 | 3/2004 | Kato et al. | |
| 6,759,935 | B2 | 7/2004 | Moro et al. | |
| 6,774,755 | B2 | 8/2004 | Nakata et al. | |
| 6,888,435 | B2 | 5/2005 | Inoue et al. | |
| 6,922,130 | B2 | 7/2005 | Okamoto | |
| 6,938,327 | B2 | 9/2005 | Takayama et al. | |
| RE39,453 | E | 1/2007 | Boytor et al. | |
| 7,219,416 | B2 | 5/2007 | Inoue et al. | |
| 7,449,984 | B2 | 11/2008 | Kawarai | |
| 7,515,028 | B1 * | 4/2009 | Sato | H01F 27/292 336/200 |
| 7,523,542 | B2 | 4/2009 | Kawarai | |
| 7,768,374 | B2 | 8/2010 | Fushimi | |
| 8,487,733 | B2 | 7/2013 | Chu et al. | |
| 8,723,629 | B1 * | 5/2014 | Liu | H01F 1/14791 336/212 |
| 8,730,001 | B2 | 5/2014 | Yoshikawa et al. | |
| 9,136,050 | B2 | 9/2015 | Hsieh et al. | |
| 9,318,251 | B2 | 4/2016 | Klesyk et al. | |
| 9,536,648 | B2 | 1/2017 | Yamaguchi et al. | |
| 9,589,716 | B2 | 3/2017 | Doljack et al. | |
| 10,777,352 | B2 | 9/2020 | Sakamoto et al. | |
| 2001/0001895 | A1 | 5/2001 | Setiabudi et al. | |
| 2001/0016977 | A1 | 8/2001 | Moro et al. | |
| 2002/0097124 | A1 | 7/2002 | Inoue et al. | |
| 2002/0097129 | A1 | 7/2002 | Johnson | |
| 2002/0148995 | A1 | 10/2002 | Yokoyama et al. | |
| 2003/0156000 | A1 | 8/2003 | Brunner | |
| 2003/0163914 | A1 | 9/2003 | Takayama et al. | |
| 2003/0218527 | A1 | 11/2003 | Okamoto | |
| 2007/0216512 | A1 | 9/2007 | Sano et al. | |
| 2008/0036566 | A1 | 2/2008 | Klesyk et al. | |
| 2008/0143466 | A1 | 6/2008 | Monma | |
| 2009/0058588 | A1 * | 3/2009 | Suzuki | H01F 27/292 336/192 |
| 2009/0231078 | A1 | 9/2009 | Watanabe | |
| 2009/0315659 | A1 * | 12/2009 | Sato | H01F 17/045 29/602.1 |
| 2010/0013587 | A1 | 1/2010 | Yan et al. | |
| 2011/0005064 | A1 * | 1/2011 | Klesyk | H01F 27/027 29/605 |
| 2011/0006870 | A1 | 1/2011 | Sakamoto | |
| 2012/0188040 | A1 * | 7/2012 | Ogawa | H01F 27/027 336/83 |
| 2013/0027161 | A1 | 1/2013 | Urano | |
| 2013/0200972 | A1 * | 8/2013 | Wada | H01F 27/022 29/605 |
| 2014/0002227 | A1 * | 1/2014 | Hsieh | H01F 5/003 336/200 |
| 2014/0097921 | A1 | 4/2014 | Ohtsubo et al. | |

FOREIGN PATENT DOCUMENTS

| | | | |
|---|---|---|---|
| CN | 201689758 | U | 12/2010 |
| CN | 201717078 | U | 1/2011 |
| EP | 1818954 | P | 8/2007 |
| JP | 2001-060523 | A | 3/2001 |
| JP | 2002-289442 | A | 10/2002 |
| JP | 2002-334807 | A | 11/2002 |
| JP | 2003-243228 | A | 8/2003 |
| JP | 2005-175158 | A | 6/2005 |
| JP | 2006-041173 | A | 2/2006 |
| WO | 2009-028247 | A1 | 3/2009 |

OTHER PUBLICATIONS

Extended European Search Report for EP Application No. 141600007, dated Oct. 26, 2017; 11 pages.

* cited by examiner

ELECTRONIC COMPONENT AND METHOD FOR MANUFACTURING ELECTRONIC COMPONENT

CROSS-REFERENCE TO RELATED APPLICATIONS

This application is a continuation of U.S. patent application Ser. No. 16/551,116 filed Aug. 26, 2019, which is a divisional of U.S. patent application Ser. No. 15/364,749 filed Nov. 30, 2016, now U.S. Pat. No. 10,438,737 issued Oct. 8, 2019, which is a divisional of U.S. patent application Ser. No. 14/209,205 filed Mar. 13, 2014, now U.S. Pat. No. 9,576,721 issued Feb. 21, 2017, which is a continuation-in-part of U.S. patent application Ser. No. 13/804,857 filed Mar. 14, 2013 now U.S. Pat. No. 9,087,634 issued Jul. 21, 2015, which claims priority to Chinese Patent Application Nos. CN201310109345.6 filed Mar. 29, 2013 and CN201410050474.7 filed Feb. 13, 2014. All of the above applications are hereby expressly incorporated by reference herein in their entireties.

BACKGROUND

The present invention relates to an electronic component and a method for manufacturing an electronic component.

In certain electronic components, a winding is assembled to a core (a wire is wound around a core). An exterior body in which the core and the winding exist is formed with a magnetic material by (compression) molding.

Further, in an electronic component that has an edgewise coil, electrode terminals that are made as separate members from a flat wire are used in the edgewise coil to enable surface mounting. The edgewise coil (winding) is a coil (winding) in which a flat wire is wound vertically in a state in which shorter sides of the flat wire are located at inner and outer circumferences of the coil, i.e., one of the shorter sides faces the center of the coil. Therefore, after the electrode terminals are connected to both ends of the flat wire, an exterior body for the electronic component can be formed by molding.

SUMMARY

An electronic component according to an aspect of the present invention includes: a magnetic core member that is made of a magnetic material and that has a flat base and a core, the flat base having a top surface, a bottom surface, a first side surface and a second side surface opposite to the first side surface, the core is located on the top surface of the flat base; a winding that has an edgewise coil in which a flat wire is wound and in which the core is inserted, the winding having two non-wound flat wires that extend from the edgewise coil; and a magnetic exterior body that covers at least the core and the edgewise coil. The two non-wound flat wires continuously extend along the top surface, the first side surface, the bottom surface and the second side surface of the flat base in this order. Further, the two non-wound flat wires located on the bottom surface work as electrodes.

In the electronic component according to the aspect of the present invention, two ends located near the second side surface of the two non-wound wires may project from the top surface, and the two ends are covered by a resin.

In the electronic component according to the aspect of the present invention, the two non-wound wires may be connected to the bottom surface of the flat base with an adhesive.

In the electronic component according to the aspect of the present invention, the bottom surface of the flat base may have two electrode grooves. The two non-wound wires may be respectively placed in the two electrode grooves.

Further, in the electronic component according to the aspect of the present invention, the first and second side surfaces of the flat base may each respectively have first and second guide grooves. The two non-wound wires may be respectively placed in the first and second guide grooves.

Further, in the electronic component according to the aspect of the present invention, two ends of the two non-wound wires may be bent toward the first side surface of the flat base. In this case, the two ends of the two non-wound wires may contact the top surface of the flat base.

Further, in the electronic component according to the aspect of the present invention, two side surfaces of the flat base respectively located between the first and second side surfaces may slant downward.

Further, in the electronic component according to the aspect of the present invention, a resin adhesive may be provided on two side surfaces of the flat base respectively located between the first and second side surfaces.

Further, in the electronic component according to the aspect of the present invention, the second side surface may slant upward.

An electronic component according to another aspect of the present invention include: a magnetic core member that is made of a magnetic material and that has a flat base and a core, the flat base having a top surface, a bottom surface, a first side surface and a second side surface opposite to the first side surface, the core is located on the top surface of the flat base; a winding that has an edgewise coil in which a flat wire is wound and in which the core is inserted, the winding having two non-wound flat wires that extend from the edgewise coil; two belt-shaped electrodes that are formed along the first side surface, the bottom surface and the second side surface of the flat base; and a magnetic exterior body that covers at least the core and the edgewise coil. The two non-wound flat wires are electrically connected to the two belt-shaped electrodes, respectively. Further, the two belt-shaped electrodes located on the bottom surface work as electrodes.

In the electronic component according to the aspect of the present invention, the two belt-shaped electrodes may be integrally formed with the magnetic core.

A method for manufacturing an electronic component according to another aspect of the present invention include: forming a magnetic core member that is made of a magnetic material and that has a flat base and a core, the flat base having a top surface, a bottom surface, a first side surface and a second side surface opposite to the first side surface, the core is located on the top surface of the flat base; forming a winding that has an edgewise coil in which a flat wire is wound and in which the core is inserted, the winding having two non-wound flat wires that extend from the edgewise coil; locating two belt-shaped electrodes along the first side surface, the bottom surface and the second side surface of the flat base so as to mount the winding to the magnetic core; placing the winding and the magnetic core in a mold; filling a mixture of a magnetic material and resin into the mold; and performing a treatment to the mixture to form a magnetic exterior body that covers at least the core and the edgewise coil.

In the method for manufacturing an electronic component according to the aspect of the present invention, the mixture may be in a slurry state. The treatment may be heating so that the mixture may be hardened (cured) by heat.

Further, in the method for manufacturing an electronic component according to the aspect of the present invention, the mixture may be in a putty state. The treatment may be heating so that the mixture may be hardened (cured) by heat.

Further, in the method for manufacturing an electronic component according to the aspect of the present invention, the treatment is that the mixture in the mold may be pressed by a compression molding method. The compressed magnetic exterior body may be taken out of the mold. Then, the compressed magnetic exterior body may be hardened (cured) by heat.

An effect of the present disclosure is as follows. Both of the two non-wound flat wires of a winding are located substantially parallel on a side of the magnetic core. As a result, a process of bending the two non-wound flat wires can be easily performed.

DESCRIPTION OF EXEMPLARY EMBODIMENTS

An electronic component and a method for manufacturing an electronic component according to embodiments of the present invention will be explained below with reference to the drawings.

First Embodiment

Figure 1:
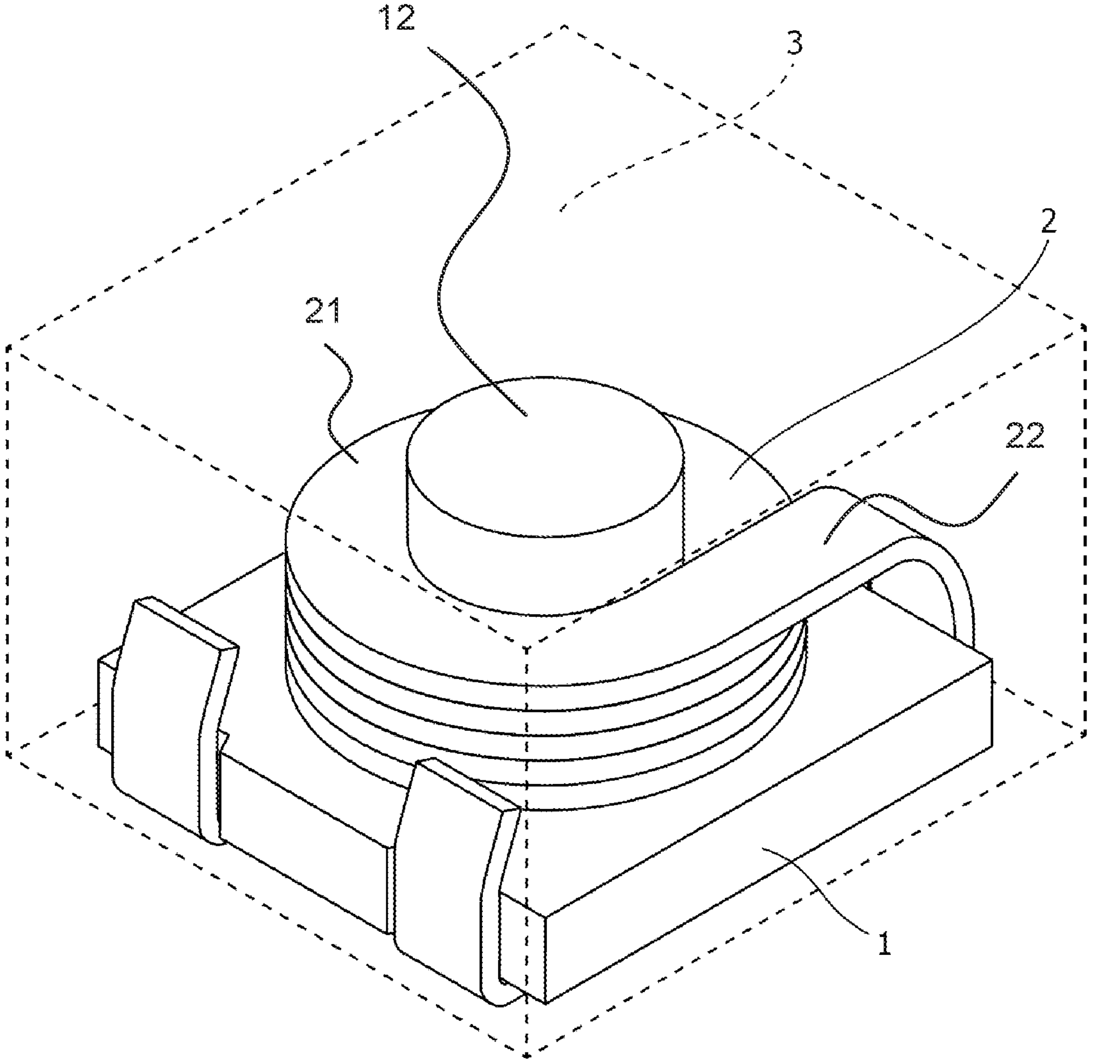
FIG. 1 is a perspective view that shows an electronic component according to a first embodiment of the present invention.

FIG. 1 is a perspective view that shows an electronic component according to a first embodiment of the present invention. Note that edges and corners of each of parts and configurations shown in FIGS. 1-17 may be smoothed by cutting sharp edges and corners as desired.

The electronic component shown in FIG. 1 corresponds to an inductor and has a magnetic core 1, a winding 2 and a magnetic exterior body 3.

Figure 2:
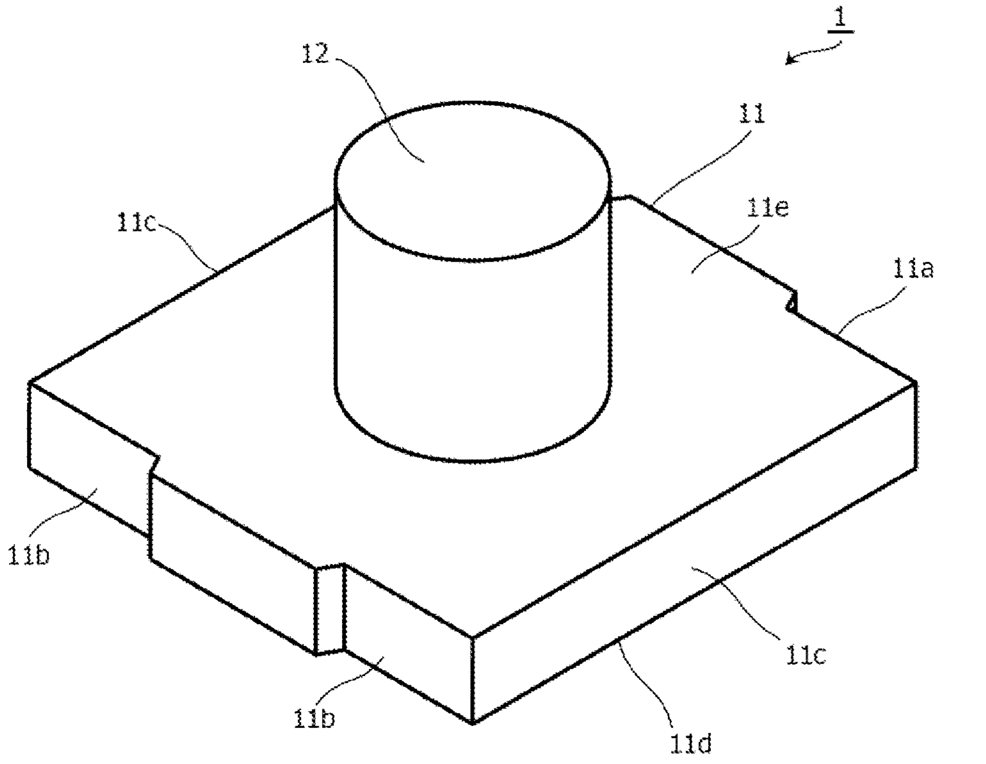
FIG. 2 is a perspective view that shows a magnetic core 1 shown in FIG. 1 of the electronic component according to the first embodiment of the present invention.

FIG. 2 is a perspective view that shows the magnetic core 1 shown in FIG. 1.

The magnetic core 1 has a flat base part 11 that is in a substantially rectangular parallelepiped shape. The flat base part 11 has four sides 11*a*, 11*b*, 11*c* and 11*c*, a bottom surface 11*d* and a top surface 11*e*. Further, the magnetic core 1 has a core part 12 that is in a substantially cylindrical shape and that extends upward from the top surface 11*e* of the flat base part 11. For instance, the magnetic core 1 corresponds to a ferrite core or a compression powder core that is formed by performing a compression molding for metal magnetic powder. Specifically, it is preferred to use metal magnetic powder, which has iron (Fe) as a main composition and respectively contains 1-10 wt % of silicon (Si) and chromium (Cr), for the compression powder core, because it has the excellent rust-prevention and relative permeability properties. Further, because a low core loss is achieved, it is further preferred to use metal magnetic powder that is a mixture of the metal magnetic powder explained above and an amorphous metal. Specifically, the amorphous metal has iron (Fe) as a main composition, 1-10 wt % of silicon (Si), 1-10 wt % of chromium (Cr), and 0.1-5 wt % of carbon (C).

In the first embodiment, as shown in FIG. 2, cut-out portions are respectively formed on edges of the first side 11*a* and the second side 11*b*. As shown in FIG. 1, a non-wound section (a non-wound flat wire) of the winding is located at each cut-out portion. The cut-put portions are formed by making predetermined surfaces of the cut-out portions closer to the core part 12 than the center surfaces of the first and second sides 11*a* and 11*b*. That is, they are recessed surfaces.

The flat base part 11 and the core part 12 can be integrally formed as a T-shaped core. Further, the flat base part 11 and the core part 12 can also be formed as separate members and can be connected, for instance, by an adhesive or a fitting structure.

Figure 3:
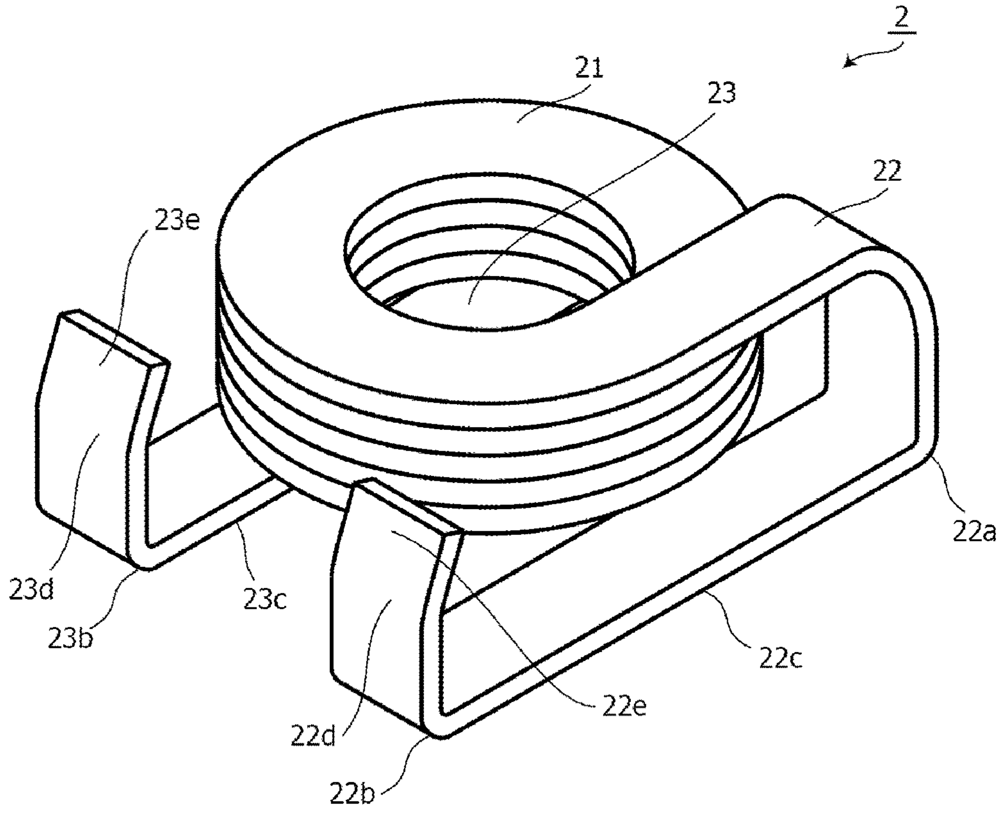
FIG. 3 is a perspective view that shows a winding 2 shown in FIG. 1 of the electronic component according to the first embodiment of the present invention.
Figure 4:
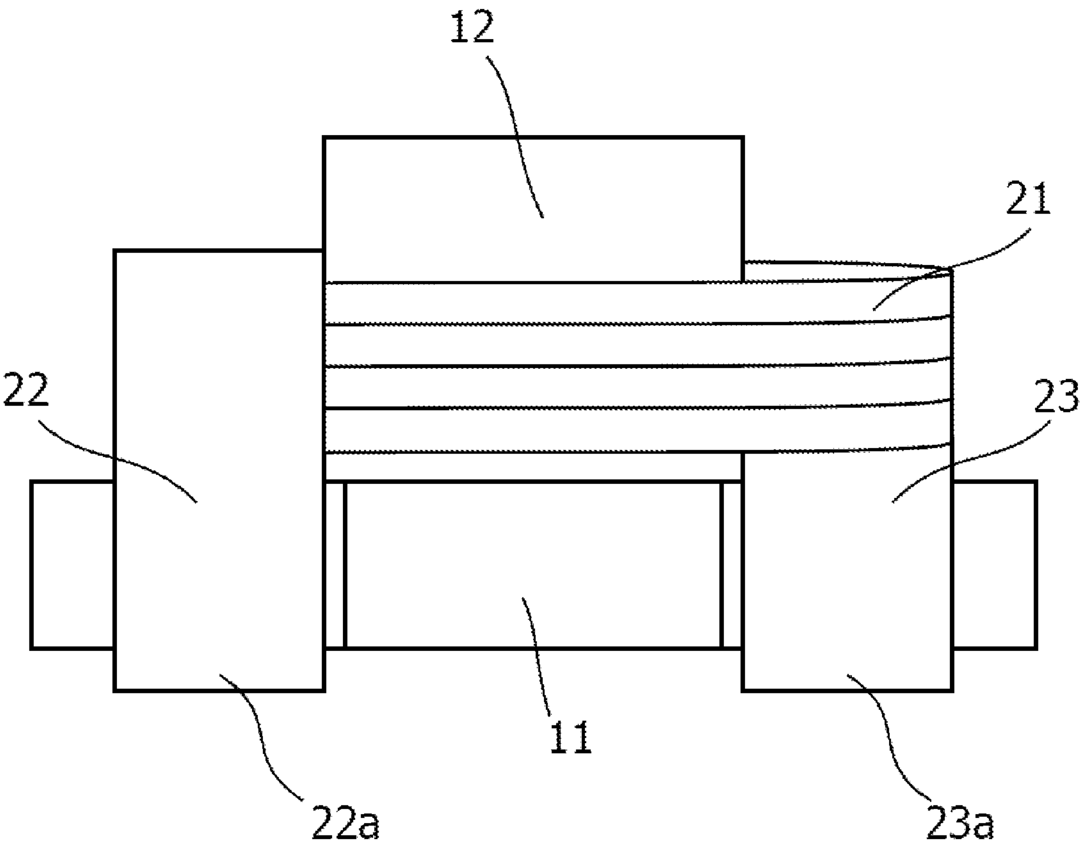
FIG. 4 is a rear view that shows the electronic component according to the first embodiment of the present invention.

FIG. 3 is a perspective view that shows the winding 2 shown in FIG. 1. FIG. 4 is a rear view that shows the electronic component according to the first embodiment of the present invention.

The winding 2 has an edgewise winding section 21 and two non-wound sections (two non-wound flat wires) 22 and 23 that are formed from the winding section 21 to two tips 22*e* and 23*e*. As shown in FIG. 1, the core part 12 of the magnetic core 1 is inserted in the winding section 21. Note that as discussed above, the edgewise coil (winding) is a coil (winding) in which a flat wire is wound vertically in a state in which shorter sides of the flat wire are located at inner and outer circumferences of the coil, i.e., one of the shorter sides faces the center of the coil.

In the winding section 21, a flat wire is wound in the edgewise method so as to vertically and helically pile up along a winding axis. Note that in the edgewise winding, a wider surface of the flat wire is substantially perpendicular to the winding axis.

Both of the two non-wound sections 22 and 23 are located substantially parallel to each other and along the first side 11*a* of the flat base part 11 of the magnetic core 1, the bottom surface 11*d* (a surface that is opposite to the top surface 11*e*) and the second side 11*b* that is opposite to the first side 11*a*. Specifically, in the first embodiment of the present invention, the two non-wound sections 22 and 23 are formed so as to be pulled out in the same direction. In this case, with respect to manufacturing processes, an automatic device can be easily used for a bending process. Thus, this configuration is suited for improving productivity. However, in terms of adjustment for an inductance characteristic, the two non-wound sections 22 and 23 can also be formed so as to be pulled out in different directions.

As shown in FIGS. 3 and 4, the two non-wound sections 22 and 23 are bent at a boundary, which corresponds to curved parts 22*a* and 23*s*, of the first side 11*a* and the bottom surface 11*d* and are bent at a boundary, which corresponds to curved parts 22*b* and 23*b*, of the bottom surface 11*d* and the second side 11*b* so as to be located along the flat base part 11 of the magnetic core 1.

Belt-shaped sections 22*c* and 23*c* (electrode sections) that are located along the bottom surface 11*d* of the magnetic core 1 in the two non-wound sections 22 and 23 are used as electrodes.

The flat wire that is used for the winding 2 is coated by an insulating layer. The insulating layer located on an area for using as an electrode is removed as desired. For instance, the insulating layer located on only electrode sections 22*c* and 23*c* explained above is removed, however, the insulating layer located on other sections, which are closer to the tips 22*e* and 23*e*, is not removed. When the insulating layer located on the electrode sections is removed, the insulating layer located on only one surface of the flat wire, i.e., a surface that faces a substrate at mounting is removed. However, the insulating layer located on a surface opposite to the electrode sections 22*c* and 23*c*, i.e., the surface that faces the magnetic core 1, is not removed.

As a result, because the areas of the non-wound sections 22 and 23 from which the insulating layer is removed have difficulty electrically contacting the magnetic exterior body 3, the insulating characteristics between the winding 2 and the magnetic exterior body 3 are improved.

However, when the insulation characteristics between the magnetic core 1 and the magnetic exterior body 3 are in a good condition, the entire insulation layer located toward the tips 22*e* and 23*e* explained above can be removed. Alternatively, the insulation layer located on areas facing the magnetic core 1 can also be removed.

The magnetic exterior body 3 is formed by a mixture of a magnetic material (magnetic powder such as ferrite or metallic magnetics) and a resin so as to cover at least the winding section 21 and the core part 12. The mixture is formed by a predetermined forming method. Here, metal magnetic power of the magnetic exterior body 3 is the same as that of the magnetic core 1. The magnetic exterior body 3 is in a substantially rectangular parallelepiped outer shape. Because the mixture is filled inside of the substantially rectangular parallelepiped shape and is cured, the magnetic exterior body 3 is formed. Further, the magnetic exterior body 3 is, for instance, formed by a manufacturing method that will be explained below. An amount of the magnetic powder in the magnetic exterior body 3 and the material that is used therefor can also be changed as desired so as to adjust the electromagnetic characteristics.

In the first embodiment of the present invention, as shown in FIG. 1, the magnetic exterior body 3 is formed so as to completely cover the winding section 21 of the winding 2, areas located along the first side 11*a* and the second side 11*b*, the core part 12 of the magnetic core 1, the top surface 11*e*, the first side 11*a*, the second side 11*b* and the two sides 11*c* of the flat base part 11.

Further, the magnetic exterior body 3 can also be formed without covering the two sides 11*c*. Also, because the magnetic exterior body 3 is formed so as to make a lower end of the magnetic exterior body 3 be at a predetermined position within a height of the side 11*c*, only a part of the side 11*c* can also be exposed (i.e., it is not covered by the magnetic exterior body 3).

Further, as shown in FIGS. 2 and 3, the two non-wound sections 22 and 23 can also be bent at the curved parts 22*d* and 23*d* that correspond to the boundary between the second side 11*b* and the top surface 11*e*. As a result, the tips 22*e* and 23*e* of the two non-wound sections 22 and 23 are located inside (e.g., inboard) of the second side 11*b* (i.e., a side closer to the core part 12).

As a result, the non-wound sections 22 and 23, specifically, the tips 22*e* and 23*e*, hardly come free from the magnetic core 1. Particularly, when the non-wound sections 22 and 23 are not fixed to the flat base part 11 by an adhesive, it is preferred that the two non-wound sections 22 and 23 are bent at the curved parts 22*d* and 23*d* as discussed above.

Further, in the first embodiment of the present invention, as explained above, sections of the two non-wound sections 22 and 23, which are closer to the tips 22*e* and 23*e* than positions that are located along (next to) the second side 11*b* of the flat base part 11, are bent toward the core part 12 from the second side 11*b*. In other words, both ends of the two non-wound sections 22 and 23 are bent toward the first side surface 11*a* of the flat base part 11. However, the first embodiment is not limited to the above configuration. The curved parts 22*d* and 23*d* may not be provided and may be left standing straight up in a finished state.

As explained above, according to the first embodiment of the present invention, both of the two non-wound sections 22 and 23 of the winding 2 are located substantially parallel to the sides 11*a* and 11*b* of the magnetic core 1 (the flat base part 11). Therefore, a bending process of the two non-wound sections 22 and 23 can be easily performed.

Second Embodiment

Figure 5:
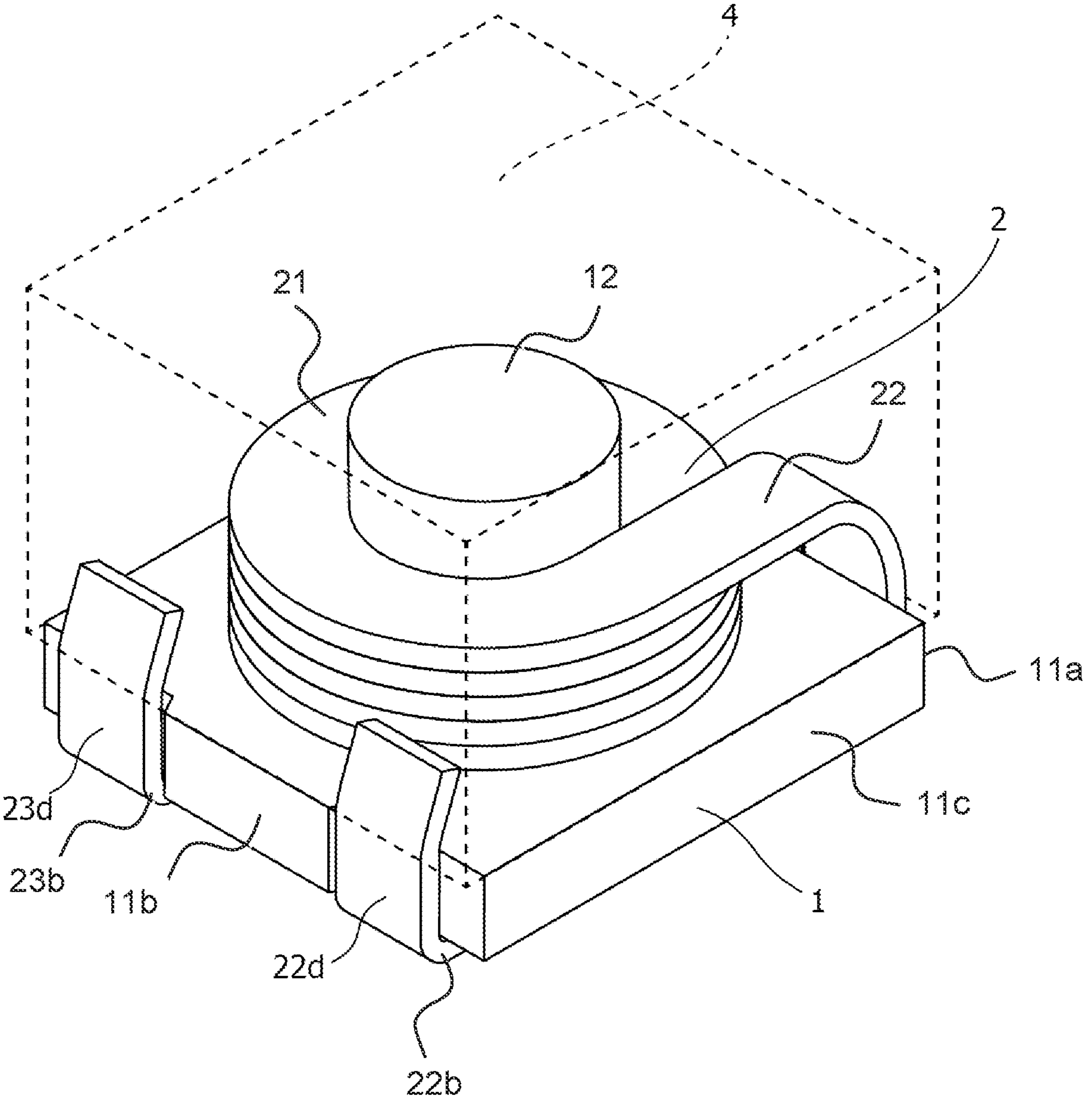
FIG. 5 is a perspective view that shows an electronic component according to a second embodiment of the present invention.

FIG. 5 is a perspective view that shows an electronic component according to a second embodiment of the present invention.

The electronic component according to the second embodiment of the present invention has a magnetic core 1 and a winding 2 that are the same as the first embodiment. However, a magnetic exterior body 4 of the second embodiment is different from the magnetic exterior body 3 of the first embodiment.

In the second embodiment, the magnetic exterior body 4 is formed by a mixture of a magnetic material (magnetic powder such as ferrite or metallic magnetics) and a resin so as to cover at least the winding section 21 and the core part 12. The mixture is formed by a predetermined forming method. The magnetic exterior body 4 is, for instance, formed by a manufacturing method that will be explained below.

In the second embodiment, as shown in FIG. 5, the magnetic exterior body 4 is formed so as to expose (not cover) sections located along the first side 11*a* and the second side 11*b* of the winding 2 and the side 11*c* of the magnetic core 1.

As explained above, according to the second embodiment, the sections located along the first side 11*a* and the second side 11*b* of the winding 2 are exposed. Therefore, when the electronic component is soldered on, for example, a circuit board, because a fillet is formed around the curved parts 22*a*, 22*b*, 23*a* and 23*b*, the electronic component having the magnetic core 1, the winding 2 and the magnetic exterior body 4 does not easily come off from the circuit board. Further, when the electronic component is mounted, for instance, on a board, the solder fillet can be visually checked. As a result, there is also an advantage that it is convenient with respect to an inspection.

The configuration with respect to the magnetic exterior body 4 of the electronic component according to the second embodiment of the present invention can also be adapted to electronic components according to other embodiments.

Third Embodiment

Figure 6:
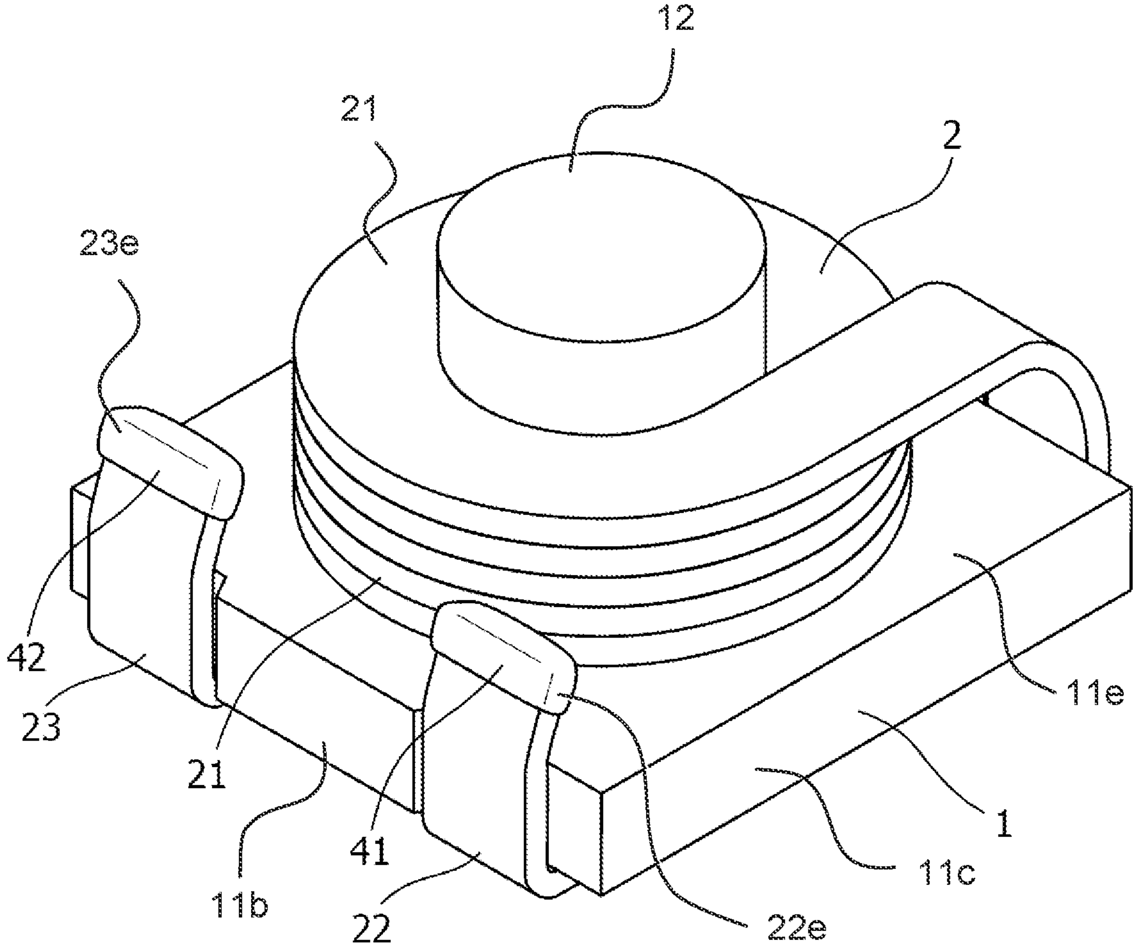
FIG. 6 is a perspective view that shows a magnetic core 1 and a winding 2 of an electronic component according to a third embodiment of the present invention.

FIG. 6 is a perspective view that shows a magnetic core 1 and a winding 2 of an electronic component according to a third embodiment of the present invention.

The electronic component according to the third embodiment of the present invention has the magnetic core 1 and the winding 2 that are the same as the first embodiment. Further, the electronic component of the third embodiment has either of the magnetic exterior body 3 of the first embodiment or the magnetic exterior body 4 of the second embodiment.

Specifically, in the third embodiment of the present invention, covering members 41 and 42, which are made of an insulating material such as a resin, are formed on the tips 22*e* and 23*e* of the non-wound sections 22 and 23 of the winding 2.

The covering members 41 and 42 are fixed to the non-wound sections 22 and 23 of the winding 2 and have longer external circumferences (peripheries) than external circumferences of the tips 22*e* and 23*e* of the non-wound sections 22 and 23. For instance, the covering members 41 and 42 are formed as follows: a resin solution is attached to the tips 22*e* and 23*e* by a dip coating method or by brush application; and then, the covering members 41 and 42 are formed by drying them at an ordinary temperature.

As explained above, in the third embodiment, sections of the two non-wound sections 22 and 23, which are closer to the tips 22*e* and 23*e* than positions that are located along (next to) the second side 11*b* of the flat base part 11, are located above the top surface 11*e* of the flat base part 11 of the magnetic core 1. Further, the two tips 22*e* and 23*e* are covered with the resin.

As a result, a short circuit in which the tips 22*e* and 23*e* of the non-wound sections 22 and 23 of the winding 2 touch the winding section 21 can be prevented during the manufacturing processes because the tips 22*e* and 23*e* are covered with the resin.

That is, even though a flat wire that is used for the winding 2 is coated by an insulating layer, the insulating layer does not usually exist on the cut surfaces (that is, end surfaces of the tips 22*e* and 23*e*) of the flat wire. Further, when the tips 22*e* and 23*e* touch the winding section 21, the insulating layer coated on the winding section 21 may be broken. Thus, a short circuit occurs. However, such a short circuit can be prevented by providing the covering members 41 and 42 for the tips 22*e* and 23*e*.

Further, the covering members 41 and 42 are fixed to the non-wound sections 22 and 23 of the winding 2 and have longer external circumferences than external circumferences of the non-wound sections 22 and 23, respectively. As a result, the tips 22*e* and 23*e* of the non-wound sections 22 and 23 do not easily come free from the magnetic core 1 and the magnetic exterior body 3 or 4 when the non-wound sections 22 and 23 are pulled downward.

Further, the configuration with respect to the covering members 41 and 42 of the electronic component according to the third embodiment of the present invention can also be adapted to electronic components according to other embodiments.

Fourth Embodiment

Figure 7:
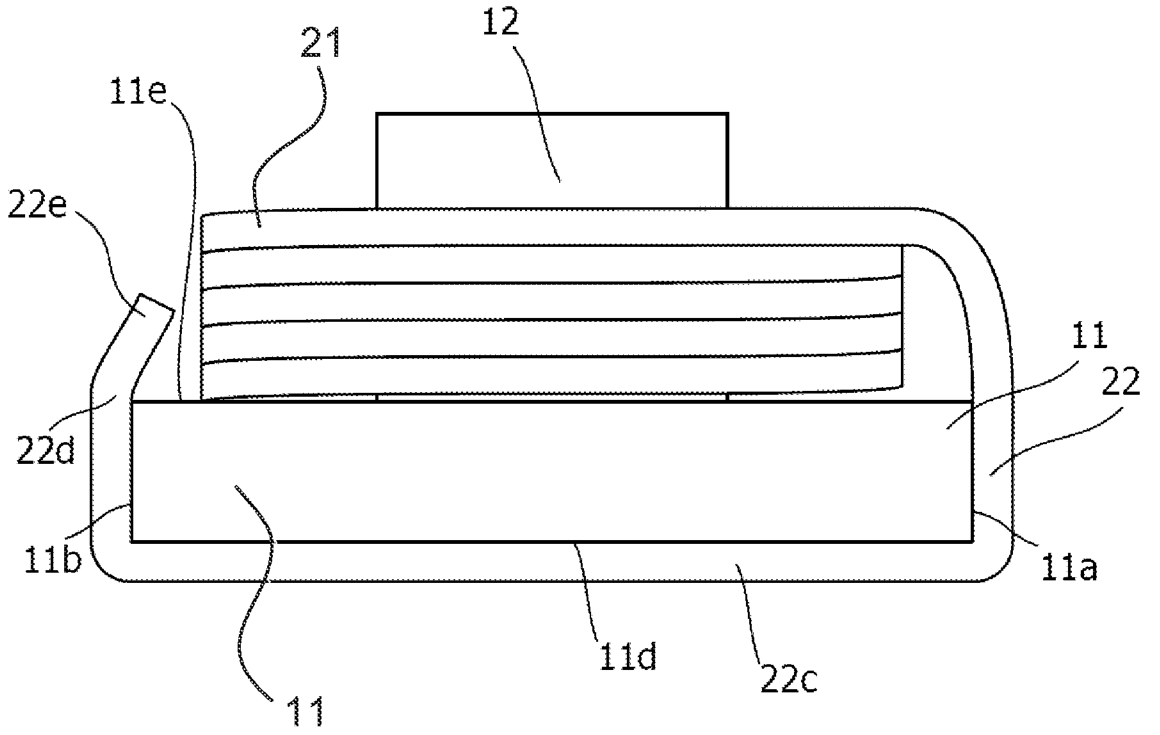
FIG. 7 is a side view that shows a magnetic core and a winding of an electronic component according to a fourth embodiment of the present invention.

FIG. 7 is a side view that shows a magnetic core 1 and a winding 2 of an electronic component according to a fourth embodiment of the present invention.

The electronic component according to the fourth embodiment of the present invention has the magnetic core 1 and the winding 2 that are the same as the first embodiment. Further, the electronic component of the fourth embodiment has either of the magnetic exterior body 3 of the first embodiment or the magnetic exterior body 4 of the second embodiment.

Specifically, the belt-shaped sections 22*c* and 23*c* of the non-wound sections 22 and 23 are fixed to the bottom surface 11*d* of the flat base part 11 of the magnetic core 1 by an adhesive. It is preferred to use an insulating adhesive, for instance, a resin adhesive as the adhesive.

Further, the non-wound sections 22 and 23 may also be fixed to the first side 11*a* and the second side 11*b* of the flat base part 11 of the magnetic core 1 by the adhesive.

Figure 8:
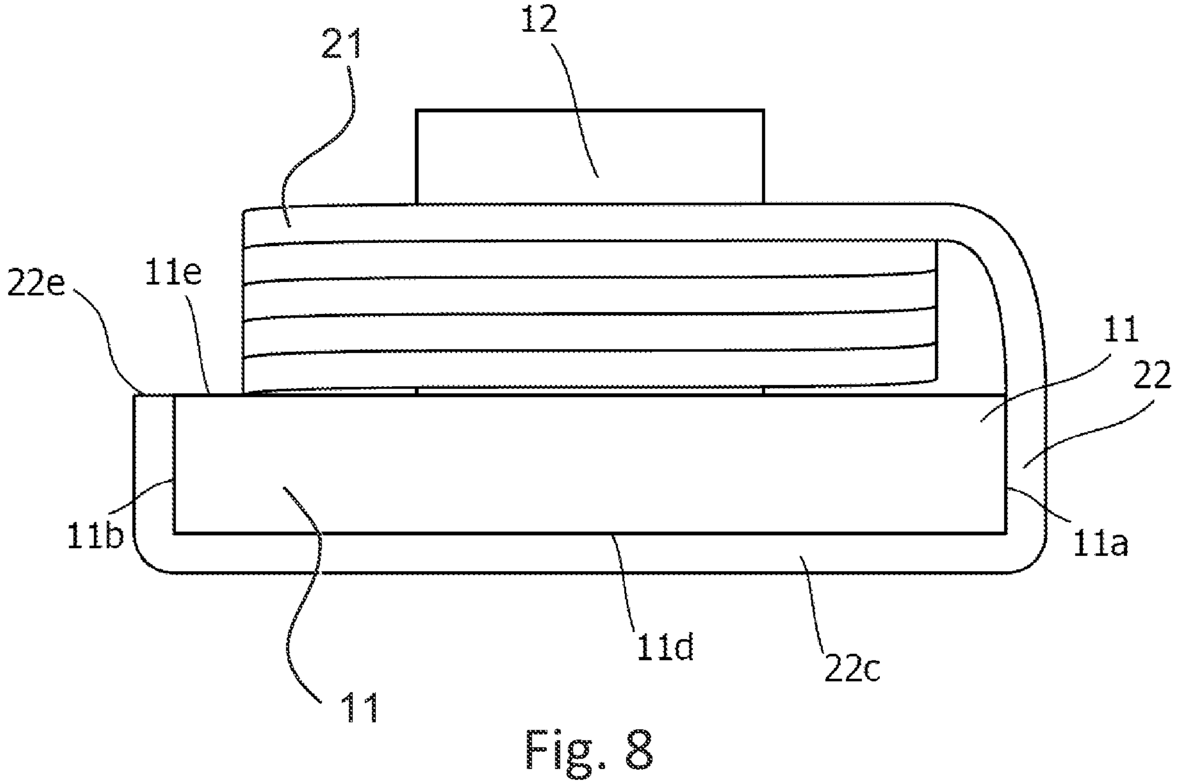
FIG. 8 is a side view that shows another winding of the electronic component according to the fourth embodiment of the present invention.

FIG. 8 is a side view that shows another winding of the winding 2 of the electronic component according to the fourth embodiment of the present invention. In the fourth embodiment, as shown in FIG. 8, the curved parts 22*d* and 23*d* shown in FIG. 3 of the non-wound sections 22 and 23 are omitted. Thus, the tips 22*e* and 23*e* of the non-wound sections 22 and 23 do not project above the top surface 11*e* of the flat base part 11 of the magnetic core 1. In this case, a short circuit does not easily occur between the tips 22*e* and 23*e* and the winding section 21 during the manufacturing processes. In the fourth embodiment, the non-wound sections 22 and 23 of the winding 2 are fixed to at least the bottom surface 11*d* of the magnetic core 1 by the adhesive. As a result, even though the curved parts 22*d* and 23*d* shown in FIG. 3 of the non-wound sections 22 and 23 are omitted, the non-wound sections 22 and 23 do not easily come off the magnetic core 1 (the flat base part 11) and the magnetic exterior body 3 or 4.

As explained above, according to the fourth embodiment, the belt-shaped sections 22*c*, 23*c*, which are located along the bottom surface 11*d*, of the two non-wound sections 22 and 23 and the bottom surface 11*d* of the flat base part 11 are fixed by the adhesive.

As a result, the non-wound sections 22 and 23 of the winding 2 do not easily come off the magnetic core 1 and the magnetic exterior bodies 3 and 4.

The configuration with respect to the adhesive fixing of the electronic component according to the fourth embodiment of the present invention can also be adapted to electronic components according to other embodiments.

Fifth Embodiment

Figure 9:
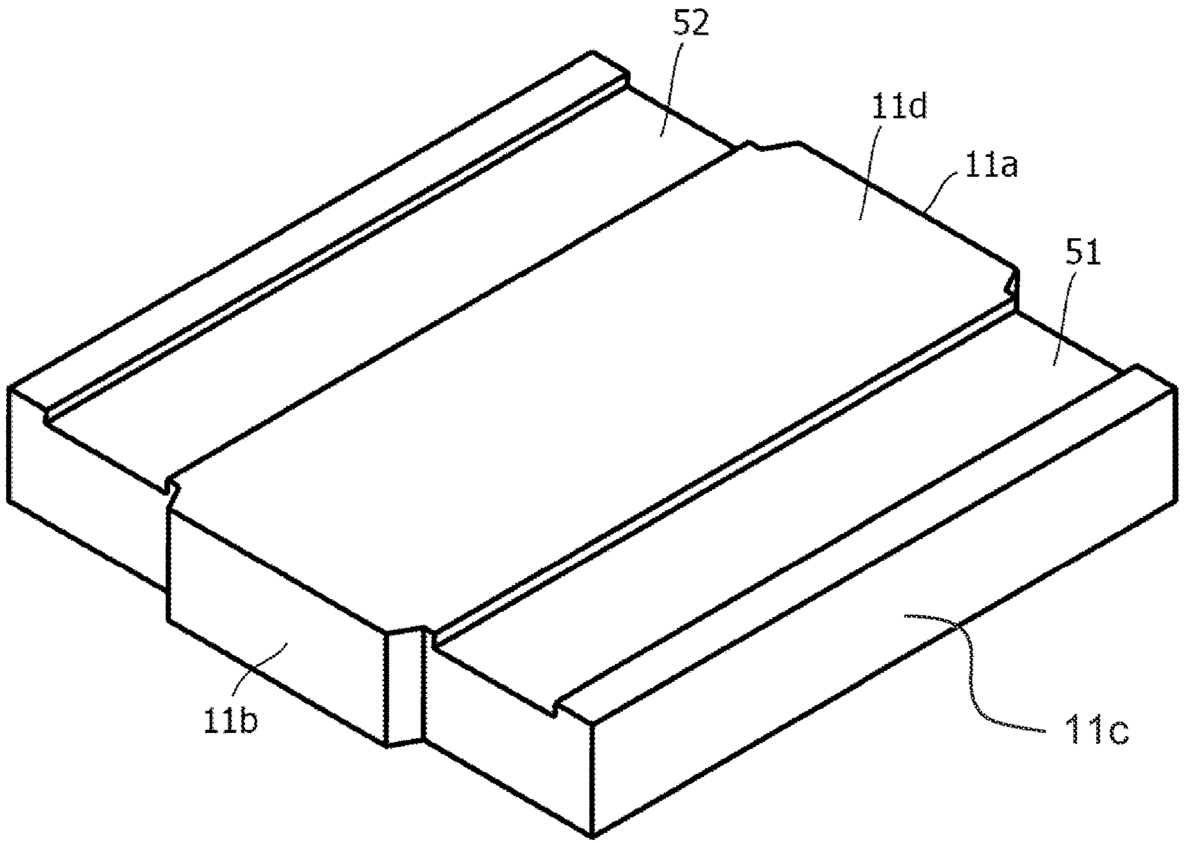
FIG. 9 is a perspective view that shows a bottom surface 11*d* of a magnetic core of an electronic component according to a fifth embodiment of the present invention.

FIG. 9 is a perspective view that shows a bottom surface 11*d* of a magnetic core 1 of an electronic component according to a fifth embodiment of the present invention.

The electronic component according to the fifth embodiment of the present invention has the magnetic core 1 and the winding 2 that are the same as the first embodiment. Further, the electronic component of the fifth embodiment has either of the magnetic exterior body 3 of the first embodiment or the magnetic exterior body 4 of the second embodiment.

Specifically, electrode grooves 51 and 52 are formed in the bottom surface 11*d* of the flat base part 11 of the magnetic core 1. The two electrode grooves 51 and 52 are formed parallel to each other between the first side 11*a* and the second side 11*b*. Further, the widths of the two electrode grooves 51 and 52 are substantially the same as the widths of the non-wound sections 22 and 23. The depths of the two electrode grooves 51 and 52 are equal to or less than a height of the flat wire (a shorter thickness). The belt-shaped sections 22*c* and 23*c* of the two non-wound sections 22 and 23 of the winding 2 are located at the electrode grooves 51 and 52 at the bottom surface 11*d*.

As explained above, in the fifth embodiment, the two electrode grooves 51 and 52 are formed in the bottom surface 11*d* of the flat base part 11 of the magnetic core 1. Both of the two non-wound sections 22 and 23 of the winding 2 are respectively located at the electrode grooves 51 and 52 provided at the bottom surface 11*d*.

As a result, the non-wound sections 22 and 23 are accurately aligned at the bottom surface 11*d* and do not easily shift.

Further, the configuration with respect to the electrode grooves 51 and 52 of the electronic component according to the fifth embodiment of the present invention can also be adapted to electronic components according to other embodiments.

Sixth Embodiment

Figure 10:
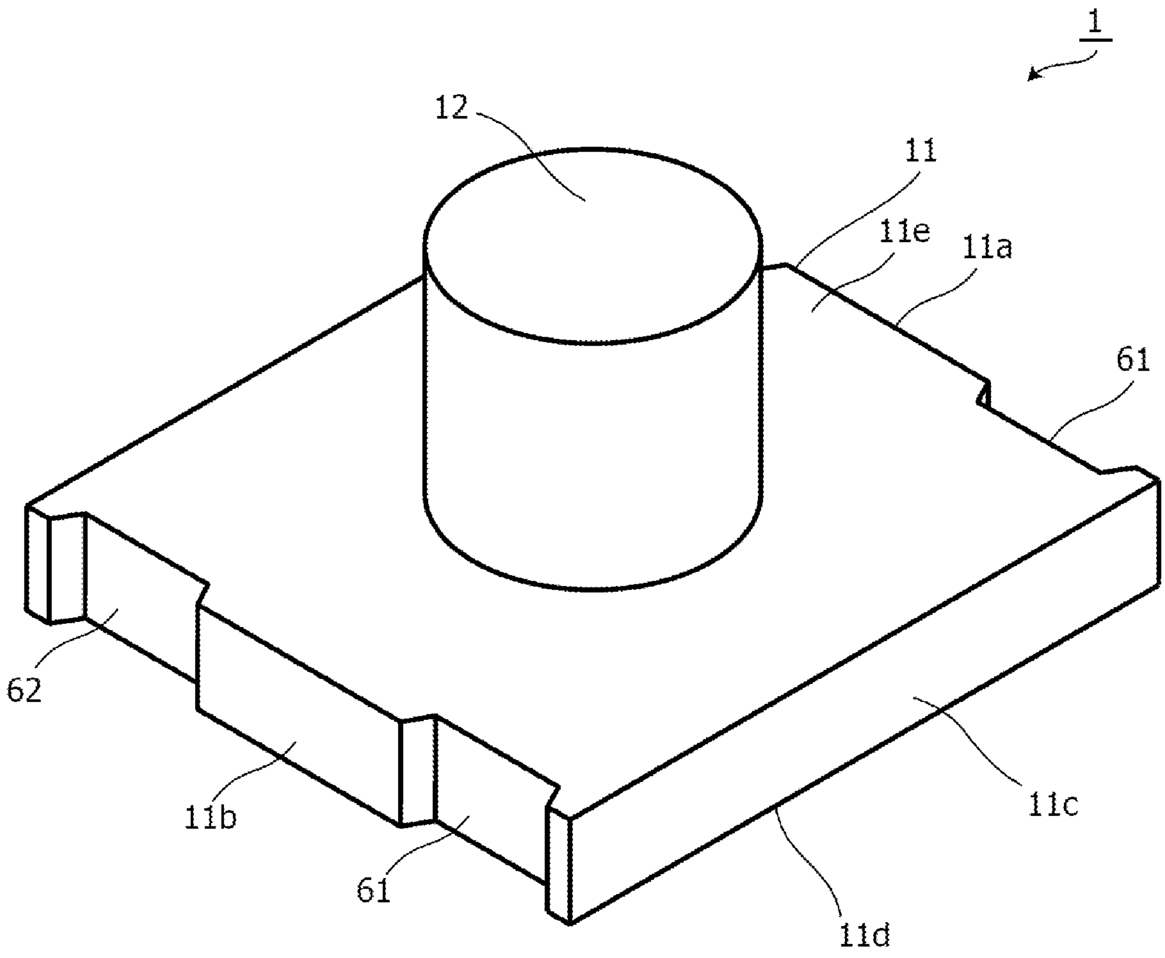
FIG. 10 is a perspective view that shows a magnetic core 1 of an electronic component according to a sixth embodiment of the present invention.

FIG. 10 is a perspective view that shows a magnetic core 1 of an electronic component according to a sixth embodiment of the present invention.

The electronic component according to the sixth embodiment of the present invention has the magnetic core 1 and the winding 2 that are the same as the first embodiment. Further, the electronic component of the sixth embodiment has either of the magnetic exterior body 3 of the first embodiment or the magnetic exterior body 4 of the second embodiment.

Specifically, guide grooves 61 and 62 are respectively formed in the first side 11*a* and the second side 11*b* of the flat base part 11 of the magnetic core 1. The guide grooves 61 and 62 are formed parallel to each other between the top surface 11*e* and the bottom surface 11*d* of the flat base part 11. Further, the widths of guide grooves 61 and 62 are substantially the same as the widths of the non-wound sections 22 and 23. The two non-wound sections 22 and 23 of the winding 2 are aligned at the guide grooves 61 and 62 located at the first side 11*a* and the second side 11*b*.

As explained above, in the sixth embodiment, the two guide grooves 61 and 62 are respectively formed at the first side 11*a* and the second side 11*b* of the flat base part 11 of the magnetic core 1. Further, both of the two non-wound sections 22 and 23 of the winding 2 are located in the guide grooves 61 and 62 in the first side 11*a* and the second side 11*b*.

As a result, the non-wound sections 22 and 23 are accurately aligned at the bottom surface 11*d* as well as the first side 11*a* and the second side 11*b* and do not easily shift.

Further, the configuration with respect to the guide grooves 61 and 62 of the electronic component according to the sixth embodiment of the present invention can also be adapted to electronic components according to other embodiments.

Seventh Embodiment

Figure 11:
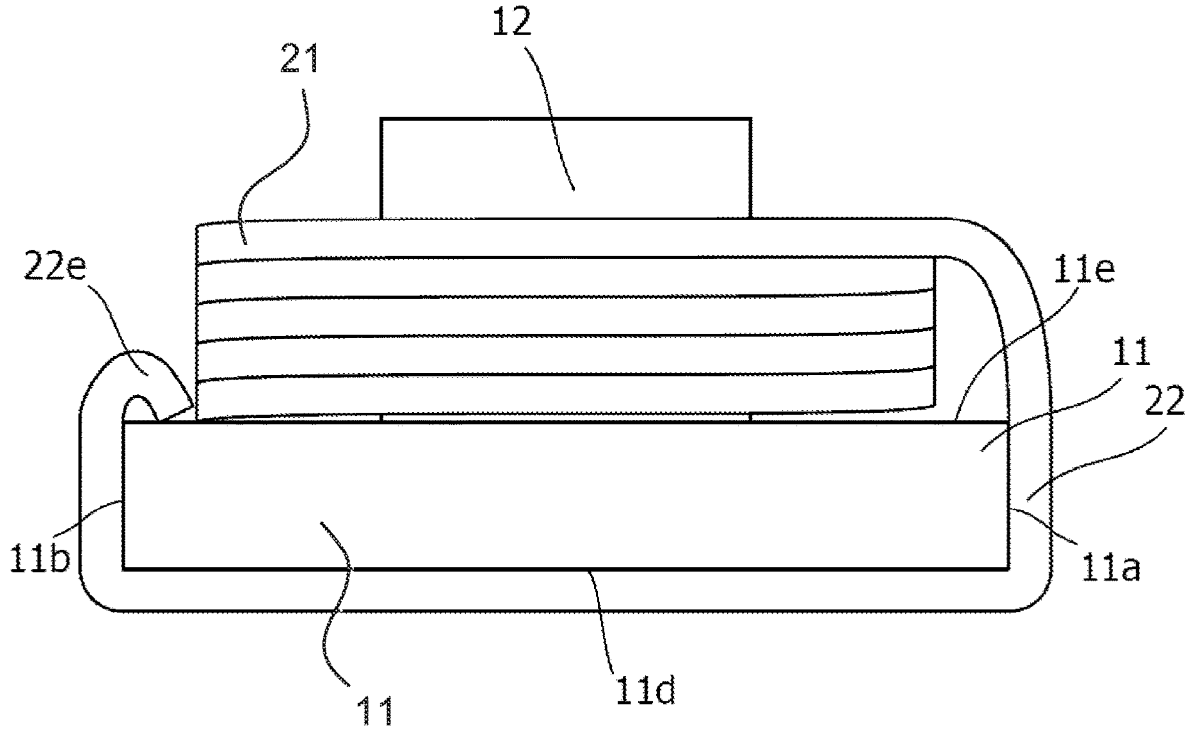
FIG. 11 is a side view that shows a magnetic core and a winding of an electronic component according to a seventh embodiment of the present invention.

FIG. 11 is a side view that shows a magnetic core 1 and a winding 2 of an electronic component according to a seventh embodiment of the present invention.

The electronic component according to the seventh embodiment of the present invention has the magnetic core 1 and the winding 2 that are the same as the first embodiment. Further, the electronic component of the seventh embodiment has either of the magnetic exterior body 3 of the first embodiment or the magnetic exterior body 4 of the second embodiment.

However, in the seventh embodiment, sections of the two non-wound sections 22 and 23, which are closer to the tips 22*e* and 23*e* than positions that are located along (next to) the second side 11*b* of the flat base part 11, are bent so as to touch the top surface 11*e* of the flat base part 11. That is, the tips 22*e* and 23*e* are bent until the tips 22*e* and 23*e* contact the top surface 11*e* of the flat base part 11.

As explained above, according to the seventh embodiment, because the tip parts of the winding 2 are bent, the two tips 22*e* and 23*e* touch the top surface 11*e* of the flat base part 11.

As a result, the tips 22*e* and 23*e* are surely spaced apart from the winding section 21. At the same time, the contact between the tips 22*e* and 23*e* and the winding section 21 during the manufacturing processes can be prevented. As a result, a short circuit does not easily occur.

Further, the configuration with respect to the contact between the tips 22*e* and 23*e* and the top surface 11*e* of the flat base part 11 of the electronic component according to the seventh embodiment of the present invention can also be adapted to electronic components according to other embodiments.

Eighth Embodiment

Figure 12:
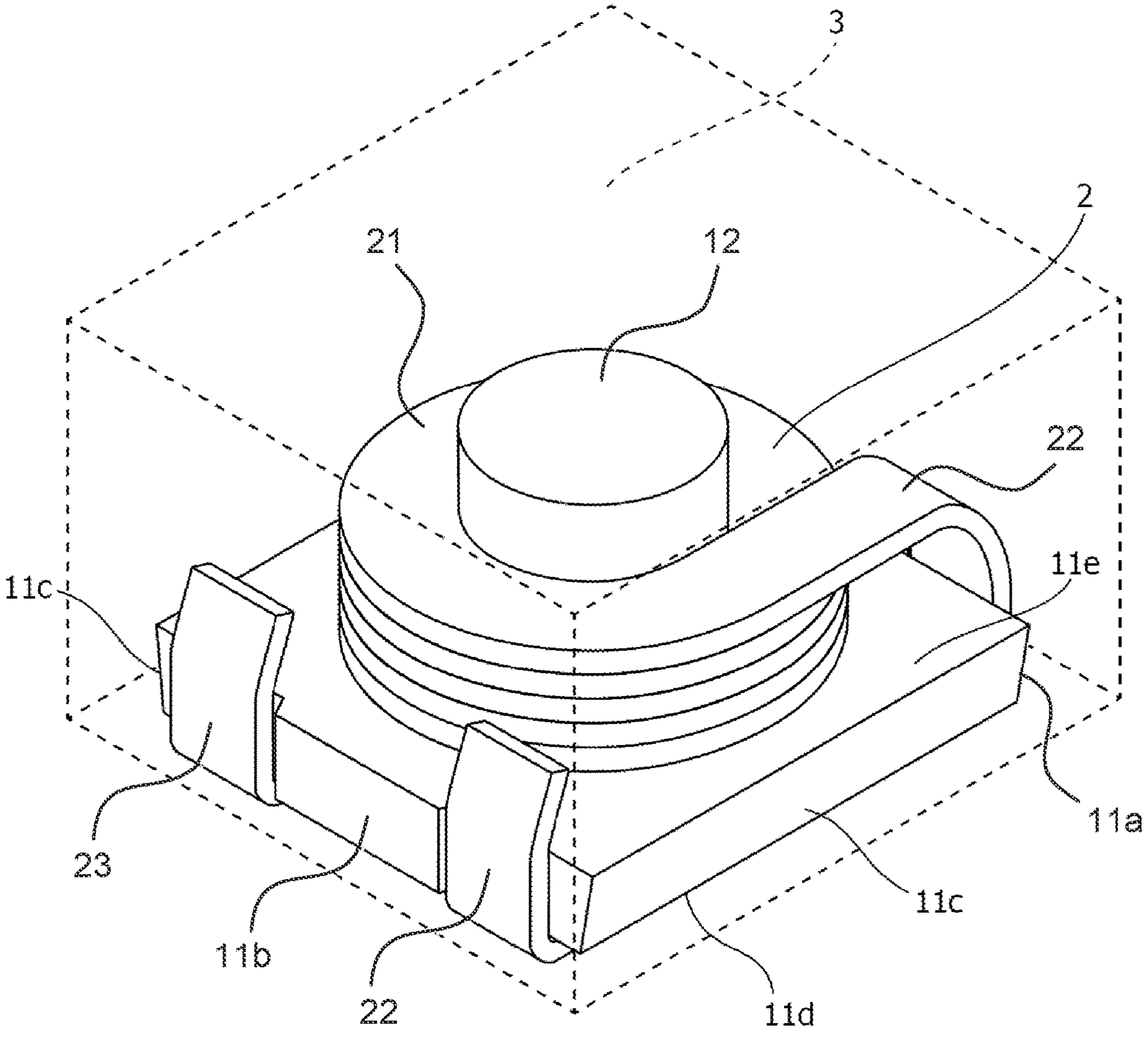
FIG. 12 is a perspective view that shows an electronic component according to an eighth embodiment of the present invention.

FIG. 12 is a perspective view that shows an electronic component according to an eighth embodiment of the present invention.

The electronic component according to the eighth embodiment of the present invention has the magnetic core 1 and the winding 2 that are the same as the first embodiment. Further, the electronic component of the eighth embodiment has either of the magnetic exterior body 3 of the first embodiment or the magnetic exterior body 4 of the second embodiment.

Specifically, in the eighth embodiment, the side 11*c* (both sides 11*c*) other than the first side 11*a* and the second side

11*b* of the flat base part 11 inclines toward the inside of the flat base part 11 from the top surface 11*e* toward the bottom surface 11*d* of the flat base part 11. In other words, the side 11*c* (both sides 11*c*) slant downward. According to the form of the magnetic core 1, an inner surface of the magnetic exterior body 3 that touches the side 11*c* of the flat base part 11 also inclines in the opposite direction to correctly accommodate with the side 11*c*.

As explained above, in the eighth embodiment, because the side 11*c* of the flat base part 11 inclines toward the inside of the flat base part 11 from the top surface 11*e* toward the bottom surface 11*d*, the magnetic exterior body 3 does not easily come upwardly free from the magnetic core 1.

Further, the configuration with respect to the slanted or inclined side 11*c* (both sides 11*c*) of the electronic component according to the eighth embodiment of the present invention can also be adapted to electronic components according to other embodiments.

Ninth Embodiment

An electronic component according to a ninth embodiment of the present invention has the magnetic core 1 and the winding 2 that are the same as the first embodiment. Further, the electronic component of the ninth embodiment has the magnetic exterior body 3 of the first embodiment.

Specifically, in the ninth embodiment, a resin adhesive is applied to the side 11*c* (both sides 11*c*) other than (i.e., between) the first side 11*a* and the second side 11*b* of the flat base part 11 among the sides 11*a*, 11*b* and 11*c* of the magnetic core 1. As a result, the surface roughness state is formed on the side 11*c* and their surface becomes rough.

Thus, after the resin adhesive is applied to the side 11*c*, the magnetic exterior body 3 is formed. Therefore, an internal surface of the magnetic exterior body 3 that touches with the side 11*c* is adhered to each other by the resin adhesive in the form according to the surface roughness. Further, an insulating coat that is formed at the side 11*c* of the magnetic core 1 explained below can be polished, for instance, by sandpaper so as to make the surface of the side 11*c* rough. Also, when the insulating coat is formed, surfaces of the side 11*c* can also be processed so as to become uneven surfaces.

As explained above, according to the ninth embodiment, after the resin adhesive is applied on the side 11*c* of the flat base part 11 of the magnetic core 1, the magnetic exterior body 3 is formed. As a result, the magnetic exterior body 3 does not easily come free from the magnetic core 1 in a vertical direction.

Further, the configuration with respect to the application of the resin adhesive on the side 11*c* of the electronic component according to the ninth embodiment of the present invention can also be adapted to electronic component according to other embodiment.

Tenth Embodiment

Figure 13:
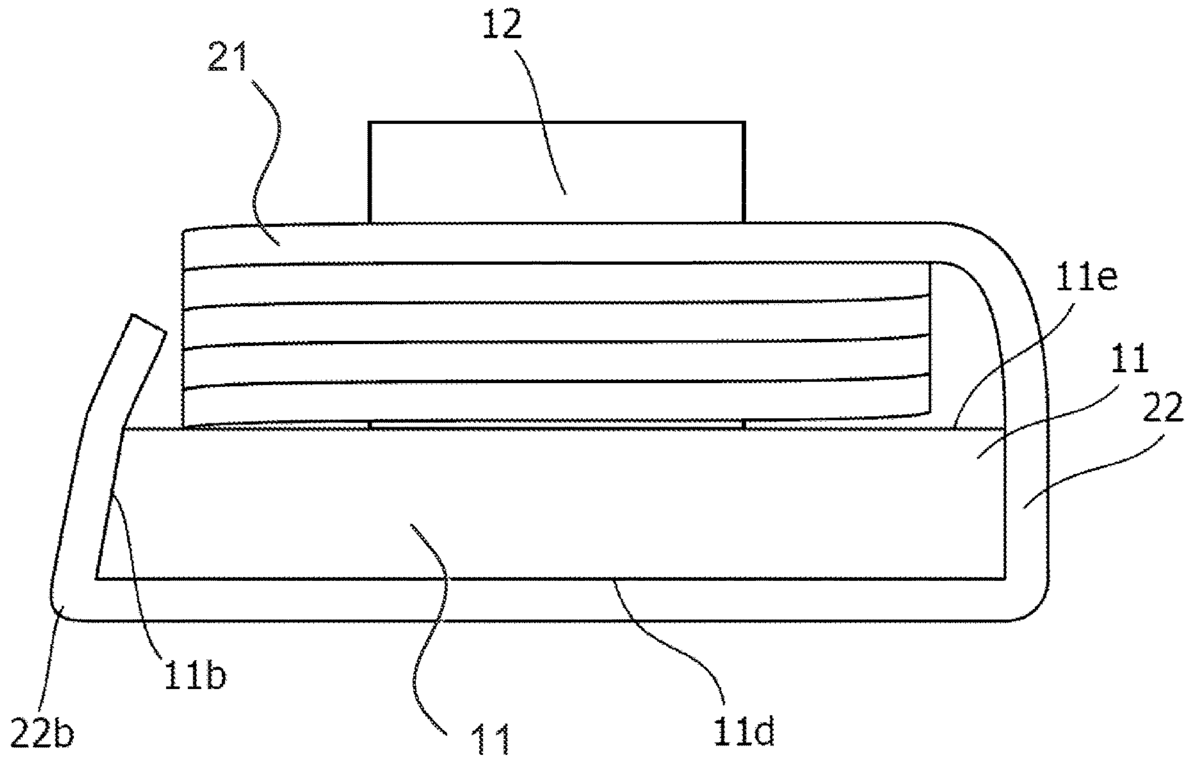
FIG. 13 is a side view that shows a magnetic core and a winding of an electronic component according to a tenth embodiment of the present invention.

FIG. 13 is a side view that shows a magnetic core 1 and a winding 2 of an electronic component according to a tenth embodiment of the present invention.

The electronic component according to the tenth embodiment of the present invention has the magnetic core 1 and the winding 2 that are the same as the first embodiment. Further, the electronic component of the tenth embodiment has either of the magnetic exterior body 3 of the first embodiment or the magnetic exterior body 4 of the second embodiment.

Specifically, in the tenth embodiment, the second side 11*b* of the flat base part 11 inclines toward the inside of the flat base part 11 from the bottom surface 11*d* toward the top surface 11*e* of the flat base part 11. In other words, the second side 11*b* slants upward. According to the form of the magnetic core 1, the non-wound sections 22 and 23 of the winding 2 are bent at a sharp angle at the curved part 22*b*.

As explained above, according to the tenth embodiment, the second side 11*b* of the flat base part 11 inclines toward the inside of the flat base part 11 from the bottom surface 11*d* toward the top surface 11*e* of the flat base part 11. As a result, the non-wound sections 22 and 23 of the winding 2 do not easily come downwardly free from the magnetic core 1.

Further, the configuration with respect to the slanted or inclined side 11*b* of the electronic component according to the tenth embodiment of the present invention can also be adapted to electronic components according to other embodiments.

Eleventh Embodiment

Figure 14:
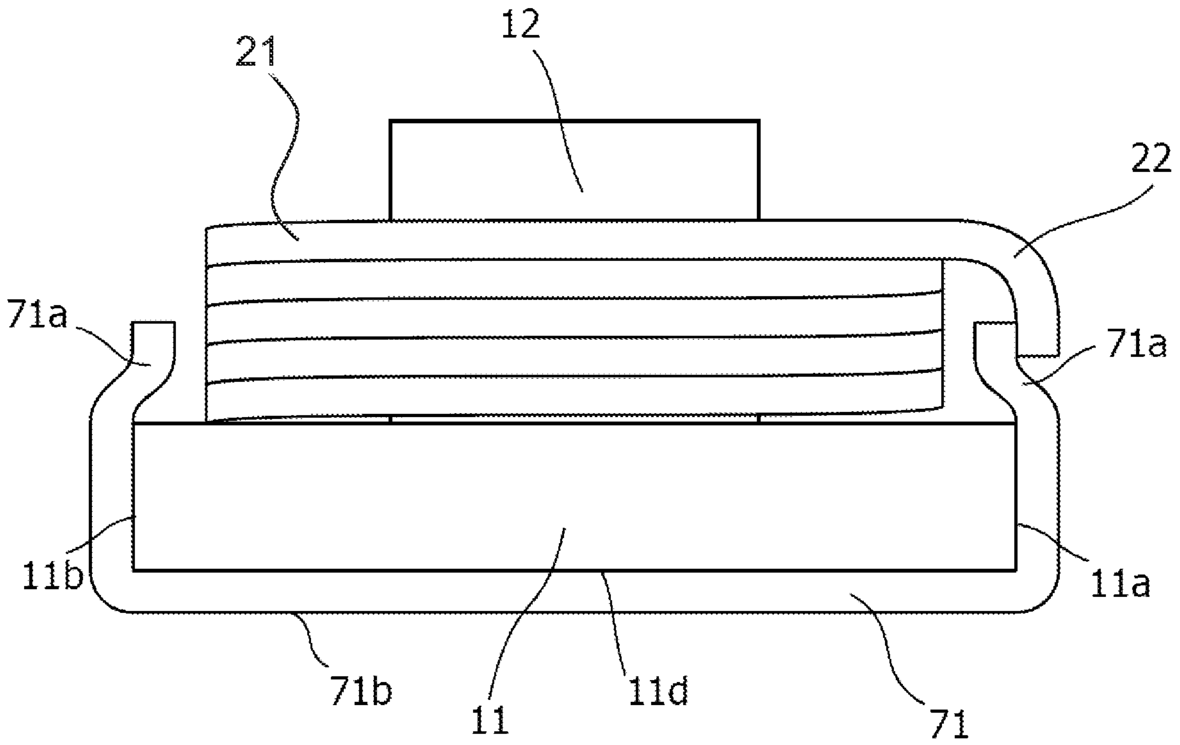
FIG. 14 is a right side view that shows a magnetic core and a winding of an electronic component according to an eleventh embodiment of the present invention.
Figure 15:
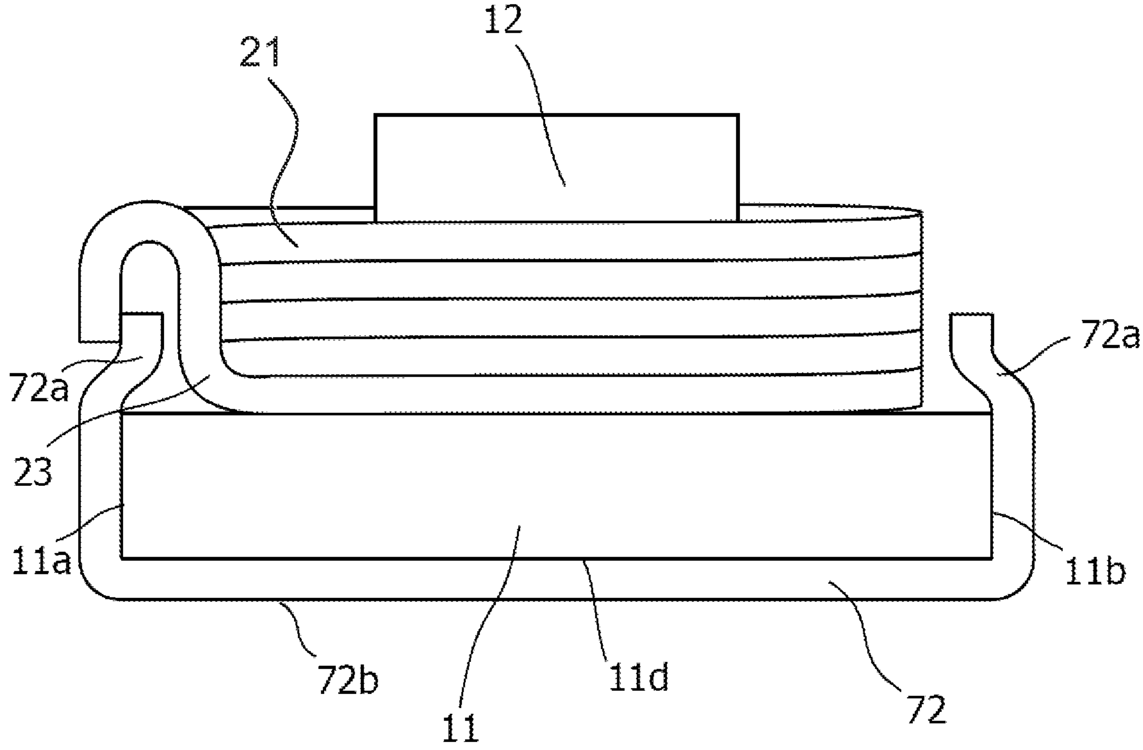
FIG. 15 is a left side view that shows the magnetic core and the winding of the electronic component according to the eleventh embodiment of the present invention.

FIG. 14 is a right side view that shows a magnetic core 1 and a winding 2 of an electronic component according to an eleventh embodiment of the present invention. FIG. 15 is a left side view that shows the magnetic core 1 and the winding 2 of the electronic component according to the eleventh embodiment of the present invention.

The electronic component according to the eleventh embodiment of the present invention has the magnetic core 1 and the winding 2 that are the same as the first embodiment. Further, the electronic component of the eleventh embodiment has either of the magnetic exterior body 3 of the first embodiment or the magnetic exterior body 4 of the second embodiment.

In addition, the electronic component according to the eleventh embodiment of the present invention has two belt-shaped electrode members 71 and 72 that are connected to the non-wound sections 22 and 23 of the winding 2 by a welding method or a soldering method and that are provided separately from the winding 2.

The belt-shaped electrode members 71 and 72 are, for instance, made of a copper material in a plate shape and are used instead of a part of the non-wound sections 22 and 23 in other embodiments. Further, the belt-shaped electrode members 71 and 72 are located along the first side 11*a*, the bottom surface 11*d* and the second side 11*b* of the flat base part 11 and are in a substantially C-shape so as to grip the first side 11*a* and the second side 11*b*. Further, an end of the non-wound section 22 is connected to one of tips 71*a* of the belt-shaped electrode member 71 (see FIG. 14). Similarly, an end of the non-wound section 23 is connected to one of tips 72*a* of the belt-shaped electrode member 72 (see FIG. 15).

Sections 71*b* and 72*b* of the two belt-shaped electrode members 71 and 72 that are located along the bottom surface 11*d* are used as electrodes.

For a shift prevention of the belt-shaped electrode members 71 and 72, the belt-shaped electrode members 71 and 72 can be fixed to the bottom surface 11*d* by an adhesive. Alternatively, the belt-shaped electrode members 71 and 72 may also be located at electrode grooves that are provided at the bottom surface 11*d*. Specifically, these electrode grooves are the same as the electrode grooves 51 and 52 shown in FIG. 9.

Further, the configuration with respect to the belt-shaped electrode members 71 and 72 of the electronic component according to the eleventh embodiment of the present invention can also be adapted to electronic components according to other embodiments.

Twelfth Embodiment

Figure 16:
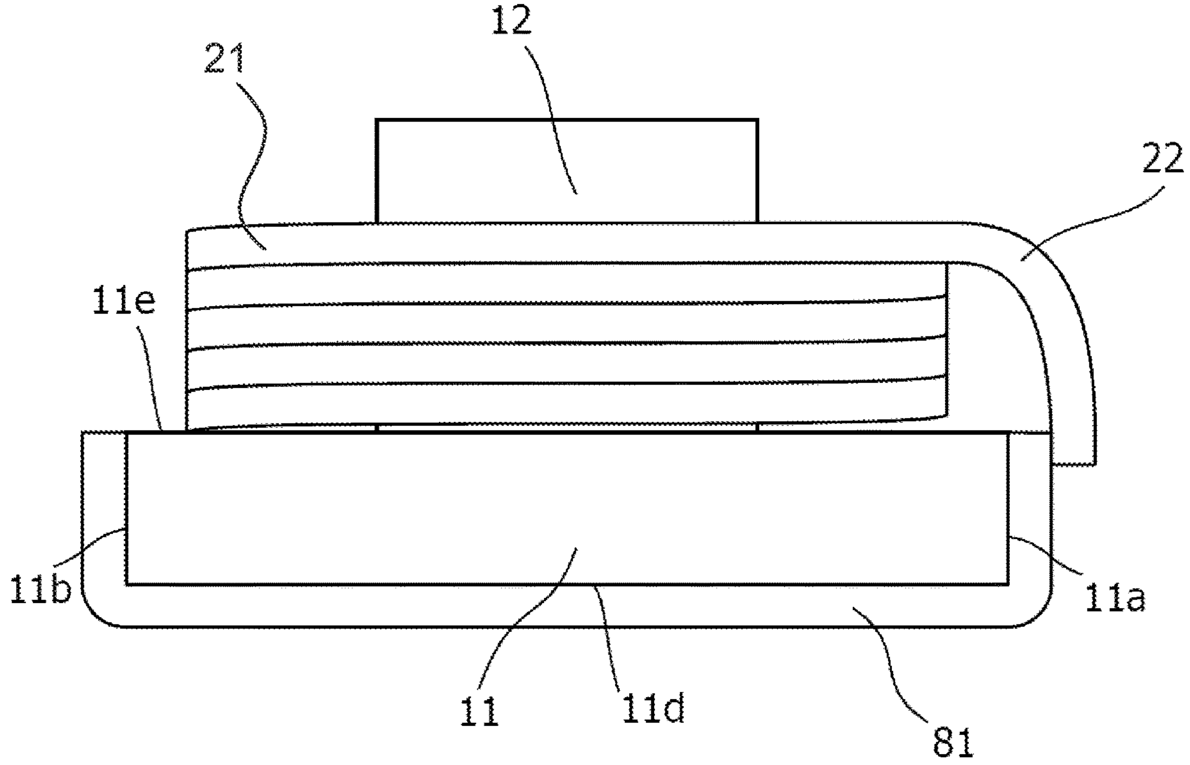
FIG. 16 is a side view that shows a magnetic core and a winding of an electronic component according to a twelfth embodiment of the present invention.

FIG. 16 is a side view that shows a magnetic core 1 and a winding 2 of an electronic component according to a twelfth embodiment of the present invention.

The electronic component according to the twelfth embodiment of the present invention has the magnetic core 1 and the winding 2 that are the same as the first embodiment. Further, the electronic component of the eighth embodiment has either of the magnetic exterior body 3 of the first embodiment or the magnetic exterior body 4 of the second embodiment.

Specifically, in the twelfth embodiment, the magnetic core 1 has two belt-shaped electrode members 81 that are integrally formed with the magnetic core 1. That is, the belt-shaped electrode members 81 are fixed to the magnetic core 1 in advance by a press molding method. Further, the belt-shaped electrode members 81 can also be formed by placing conductive material paste on the surface of the magnetic core 1 and sintering it at the high temperature. Specifically, the conductive material paste is, for instance, silver paste of which the main composition is silver. The belt-shaped electrode members 81 are used instead of a part of the non-wound sections 22 and 23 in other embodiments.

The two belt-shaped electrode members 81 are integrally formed with the magnetic core 1 and located along the first side 11*a*, the bottom surface 11*d* and the second side 11*b* of the flat base part 11 of the magnetic core 1.

Further, an end of one of the belt-shaped electrode members 81 is connected to the non-wound section 22 of the winding 2 by the welding method. An end of the other of the belt-shaped electrode members 81 is connected to the non-wound section 23 of the winding 2 by the welding method.

For a shifting or coming off prevention of the belt-shaped electrode members 81, the belt-shaped electrode members 81 can also be located at electrode grooves that are provided at the bottom surface 11*d*. Specifically, the electrode grooves are the same as the electrode grooves 51 and 52 shown in FIG. 9.

Further, the configuration with respect to the integrally formed belt-shaped electrode members 81 of the electronic component according to the twelfth embodiment of the present invention can also be adapted to electronic components according to other embodiments.

Thirteenth Embodiment

A method for manufacturing an electronic component according to a thirteenth embodiment of the present invention is for manufacturing the electronic components according to the first through twelfth embodiments of the present invention explained above.

Figure 17:
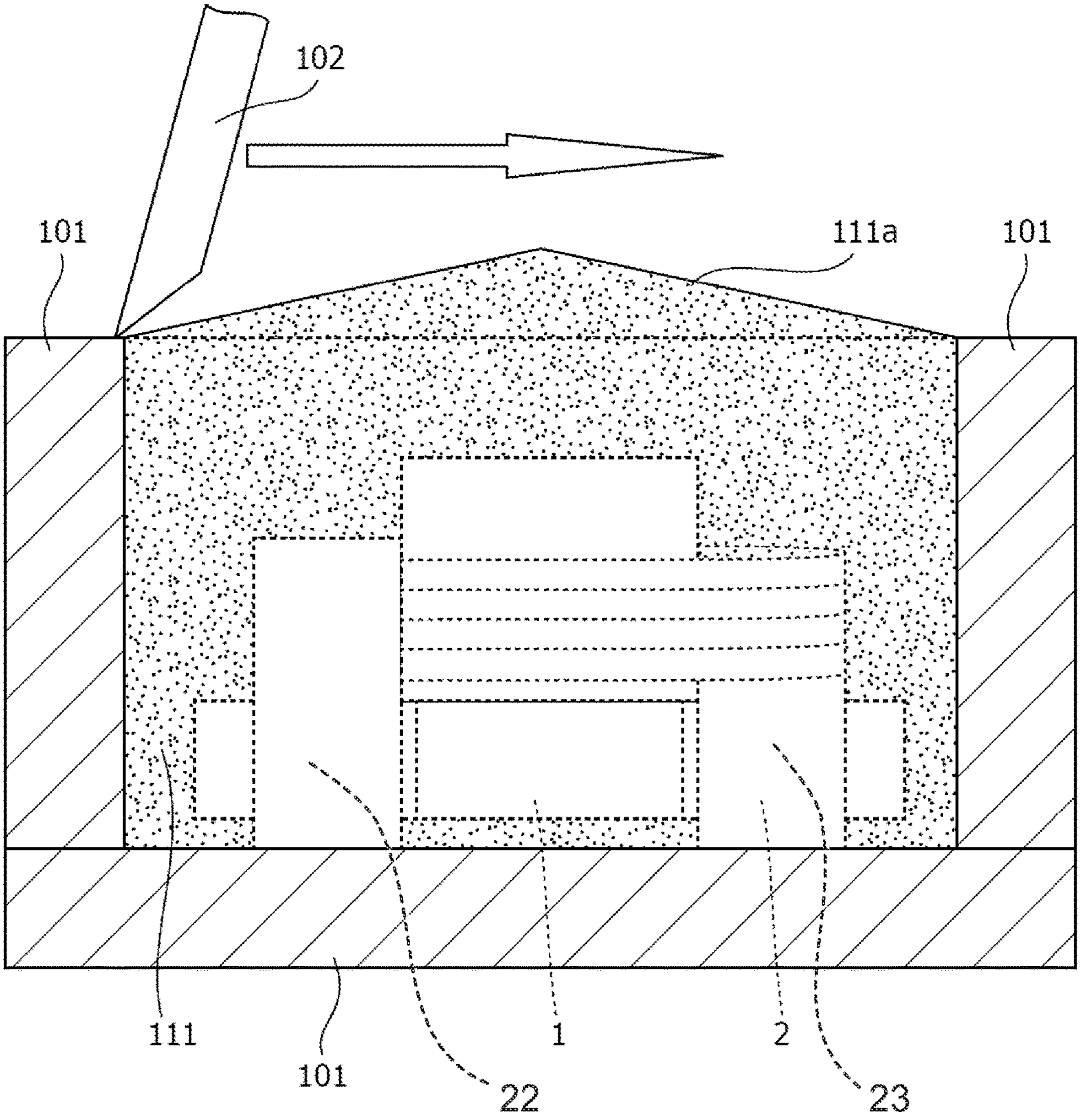
FIG. 17 is a cross-sectional view that explains a method for making a magnetic exterior body in a method for manufacturing an electronic component according to a thirteenth embodiment of the present invention.

FIG. 17 is a cross-sectional view that explains a method for making a magnetic exterior body in a method for manufacturing an electronic component according to the thirteenth embodiment of the present invention.

In the method for manufacturing the electronic component according to the thirteenth embodiment, first of all, the winding section 21 of the winding 2 is formed by winding a flat wire (an edgewise winding (an edgewise coil)). Further, the flat wire is cut off so as to make the two non-wound sections 22 and 23 that each has an appropriate length. The two non-wound sections 22 and 23 are linear and are substantially parallel to each other.

When the flat wire is covered with the insulating layer, the predetermined areas of the insulating layer such as the electrode portions are removed. At this time, for removing the insulating layer, it is possible to use such as an ultraviolet ray generating machine, a cutter machine, a chemical product, and a laser machine. Particularly, in consideration of the low cost and partial removal of small areas, it is preferred that the cutter machine or the laser machine is used.

Next, in a forming process, the core part 12 of the magnetic core 1 is inserted into the winding section 21. Further, by using an appropriate jig or automatic machines, the two non-wound sections 22 and 23 are collectively and sequentially bent and located along the first side 11*b*, the bottom surface 11*d* and the second side 11*b* of the flat base part 11 of the magnetic core 1. As a result, the winding 2 is attached to the magnetic core 1. See, for example, FIGS. 1 and 4.

Thereafter, as shown in FIG. 17, the winding 2 and the magnetic core 1 after the forming process are placed inside a mold 101.

Next, in the thirteenth embodiment, a slurry state mixture material 111 that contains magnetic materials and a resin is injected by a dispenser (not shown) and is filled in the mold 101.

The mixture material 111 is formed by adding a solvent (such as acetone) to a mixture of metal magnetic powder and a resin. Specifically, the metal magnetic power has iron (Fe) as a main composition with chromium and silicon as additional materials. The resin can be chosen from a group comprising an epoxy resin, a silicone resin or a mixture thereof. As a result, the mixture material 111 has relatively high fluidity.

Next, under a predetermined drying condition (a temperature condition and a time condition in a drying process), the mixture material 111 that is filled in the mold 101 is dried by evaporating the solvent from the mixture material 111. As a result, the mixture material 111 is solidified (less fluidity).

At this time, due to the evaporation of the solvent, holes are made by bubbles in a top surface of the mixture material 111 in the mold 101. Therefore, a smoothing process for the top surface is performed while removing a surplus portion 101*a* of the mixture material 111 with a blade 102. When the electronic component is mounted on a circuit board, an automatic conveying device performs vacuum suction to the surface of the electronic component and conveys it. Therefore, the smooth surface is required for the electronic component (the magnetic exterior body).

Next, under a predetermined cure condition (a temperature condition and a time condition in a curing process), the mixture material 111 is cured by heat in the mold 101. As a result, the magnetic exterior bodies 3 and 4 are formed. After the electronic component is taken out from the mold 101, the surfaces of the magnetic exterior bodies 3 and 4 are polished as desired.

As explained above, according to the thirteenth embodiment, the electronic components explained in the first through twelfth embodiments above can be manufactured.

Fourteenth Embodiment

A method for manufacturing an electronic component according to a fourteenth embodiment of the present invention is accomplished in order to manufacture the electronic components according to the first through twelfth embodiments explained above.

In the method for manufacturing the electronic component according to the fourteenth embodiment of the present invention, first of all, the making of the winding section 21 and the above forming processes are performed in the same manner as the thirteenth embodiment.

After that, the winding 2 and the magnetic core 1 after the forming process are placed in a mold. Further, in the fourteenth embodiment, the mold 101 or the blade 102 that are the same as the thirteenth embodiment can be used. However, because a viscosity of a mixture material is higher as compared with the mixture material in the thirteenth embodiment, conditions for a filling pressure during a filling process of the mixture material and a scraping force for the surplus portion by the blade 102 are appropriately changed.

Next, in the fourteenth embodiment, a putty state mixture material (a clayish state) that contains the magnetic material and the resin is injected by the dispenser (not shown) and is filled in the mold 101.

In the same manner as the thirteenth embodiment, the mixture material is formed by adding a solvent (such as terpineol) to a mixture of metal magnetic powder and a resin such as an epoxy resin or a silicon resin as desired. Specifically, the metal magnetic powder has iron (Fe) as a main composition with chromium, silicon and manganese as additional materials.

For instance, a mixing ratio of the metal magnetic powder and the epoxy resin is between 91 wt %: 9 wt % and 95 wt %: 5 wt %. Specifically, the metal magnetic powder is formed by mixing amorphous metal magnetic powder (including at least iron (Fe), silicon, chromium and manganese) and alloy powder (iron-silicon-chromium system) with a mixing ratio of 1:1 (we %). At this time, the mixture material is formed by adding the solvent of less than 2 wt % (alternative the solvent is not added). Thus, it is preferred that the mixture material has the solvent that is added substantially equal to or less than 2 wt % in the fourteenth embodiment.

The mixture material that is used in the fourteenth embodiment has higher viscosity as compared with the mixture material in the thirteenth embodiment and has a lower fluidity so that a lump of the mixture material does not flow and spread like a liquid when being placed on a plane surface. Therefore, the putty state mixture material is filled in the mold by pressurizing with a higher pressure than the pressure used in the thirteenth embodiment.

Next, under a predetermined drying condition (a temperature condition and a time condition in a drying process), the mixture material that is filled in the mold 101 is dried by evaporating the solvent from the mixture material. As a result, the mixture material is solidified (less fluidity). Further, when the mixture material is formed without containing the solvent, the drying process can be omitted.

At this time, due to the evaporation of the solvent, holes are made by bubbles in a top surface of the mixture material. Therefore, a smoothing process for the top surface is performed while removing a surplus portion of the mixture material with a blade. In the fourteenth embodiment, the number of holes made by the bubbles that are formed in the top surface of the mixture material decrease compared with the holes in the thirteenth embodiment because the mixture material used in the fourteenth embodiment has less amount of the solvent. Further, when the mixture material is formed without containing the solvent, the bubbles are not generated.

Next, under a predetermined cure condition (a temperature condition and a time condition in a curing process), the mixture material is cured by heat in the mold. As a result, the magnetic exterior bodies 3 and 4 are formed. After that, the electronic component is taken out from the mold 101.

After the electronic component is taken out from the mold 101, the surfaces of the magnetic exterior bodies 3 and 4 are polished as desired. Further, when the putty state mixture material is used, the surfaces of the magnetic exterior bodies 3 and 4 become in a good (smooth) state. As a result, the polishing may be omitted depending on surface smoothness states.

As explained above, according to the fourteenth embodiment, the electronic components explained in the first through twelfth embodiments above can be manufactured.

Fifteenth Embodiment

A method for manufacturing an electronic component according to a fifteenth embodiment of the present invention is accomplished in order to manufacture the electronic components according to the first through twelfth embodiments explained above.

In the method for manufacturing the electronic component according to the fifteenth embodiment of the present invention, first of all, the making of the winding section 21 and the above forming process are performed in the same manner as the thirteenth embodiment.

Then, the winding 2 and the magnetic core 1 after the forming process are placed in a mold (for a press mold method). After that, a mixture material that contains a magnetic material and a resin is filled in the mold for the press mold.

The mixture material that is used in the fifteenth embodiment does not contain a solvent. The mixture material is in a granulated powder state in which an outer surface of each of metal magnetic powder is coated with a resin layer.

Then, because the mixture material that is filled in the mold is processed by a compression molding method, the magnetic exterior bodies 3 and 4 are formed.

The winding 2, the magnetic core 1 and the magnetic exterior bodies 3, 4 are taken out from the mold after the compression molding method is performed. After that, they are cured by heat under a predetermined cure condition (a temperature condition and a time condition in a curing process).

In the above method for manufacturing the electronic component according to the fifteenth embodiment, because the mixture material is formed by the compression molding method without the solvent, the bubbles explained above are not generated.

As explained above, according to the fifteenth embodiment, the electronic components explained in the first through twelfth embodiments above can be manufactured.

Further, each embodiment explained above is a preferred example for the present invention. However, the present invention is not limited to these embodiments. The electronic component and the method for manufacturing the electronic component being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

For instance, the electronic component according to each of the embodiments explained above corresponds to an inductor. However, electronic components can also be formed as one package in which an element that has a magnetic core, a winding and a magnetic exterior body or an element that has a magnetic core and a winding together with another element.

Further, according to the electronic component of each of the embodiments explained above, the core part 12 of the magnetic core 1 projects above an uppermost surface of the winding section 21 of the winding 2. However, a top surface of the core part 12 of the magnetic core 1 can be lower than the uppermost surface of the winding section 21 of the winding 2. In other words, the height of the core part 12 of the magnetic core 1 can be set according to a required inductance value for an electronic component.

Further, a rust preventive treatment for the magnetic core 1 of the electronic component in each of the embodiments explained above can also be performed in advance as desired.

Further, an insulating coating layer, which is made of, for example, a resin, can also be formed on the sides 11*a*, 11*b*, 11*c* and the bottom surface 11*d* and/or the outer surface of the core part 12 (that is, surfaces other than a surface through which a magnetic flux formed by the winding 2 crosses at substantially right angle) of the flat base part 11 of the magnetic core 1 of the electronic component discussed in each of the embodiments explained above. In this case, when the insulating coating layer is formed on the top surface 11*e* of the flat base part 11 of the magnetic core 1 and on the top surface of the core part 12, a magnetic gap is generated by the insulating coating layer. Therefore, the insulating coating layer is not formed on the top surface 11*e* of the flat base part 11 of the magnetic core 1 and on the top surface of the core part 12.

What is claimed is:

1. An electronic component, comprising:

a magnetic core member that is made of a magnetic material and that has a flat base and a core, the flat base having a top surface, a bottom surface, a first side surface, and a second side surface opposite to the first side surface, the core being located on the top surface of the flat base;

a winding that has an edgewise coil in which the core is inserted, the edgewise coil being formed by winding a flat wire having first and second ends opposite to each other, the winding having first and second non-wound flat wires that extend from the edgewise coil, the first and second non-wound flat wires including the first and second ends, respectively;

first and second belt-shaped electrodes that are along the first side surface, the bottom surface, and the second side surface of the flat base, the first and second belt-shaped electrodes being formed separately from the edgewise coil; and a magnetic exterior body that covers at least the core and the edgewise coil, wherein a first end portion of the first belt-shaped electrode upwardly extends beyond the top surface of the flat base and is bent toward the edgewise coil, and a first tip of the first end portion is aligned over the top surface of the flat base in a plan view, a second end portion of the second belt-shaped electrode upwardly extends beyond the top surface of the flat base and is bent toward the edgewise coil, and a second tip of the second end portion is aligned over the top surface of the flat base in the plan view, and the first and second ends of the first and second non-wound flat wires are electrically connected to the first and second tips of the first and second belt-shaped electrodes, respectively.

2. The electronic component according to claim 1, wherein the first and second belt-shaped electrodes are integrally formed with the magnetic core member.

3. The electronic component according to claim 1, wherein the first and second belt-shaped electrodes are connected to the bottom surface of the flat base.

4. The electronic component according to claim 1, wherein the bottom surface of the flat base has first and second electrode grooves, and the first and second belt-shaped electrodes are respectively located in the first and second electrode grooves.

5. The electronic component according to claim 1, wherein the first and second side surfaces of the flat base each respectively has first and second guide grooves, and the first and second belt-shaped electrodes are respectively located in the first and second guide grooves.

6. The electronic component according to claim 1, wherein the first belt-shaped electrode has a third end portion opposite to the first end portion, and the second belt-shaped electrode has a fourth end portion opposite to the second end portion, the third end portion of the first belt-shaped electrode upwardly extends beyond the top surface of the flat base and is bent toward the edgewise coil, and a third tip of the third end portion is aligned over the top surface of the flat base in the plan view, and the fourth end portion of the second belt-shaped electrode upwardly extends beyond the top surface of the flat base and is bent toward the edgewise coil, and a fourth tip of the fourth end portion is aligned over the top surface of the flat base in the plan view.

7. The electronic component according to claim 1, wherein a resin adhesive is provided on two side surfaces of the flat base respectively located between the first and second side surfaces.

* * * * *